(12) United States Patent
Rabault et al.

(10) Patent No.: US 11,800,878 B2
(45) Date of Patent: Oct. 31, 2023

(54) FILLING FOR A BAKERY OR CHOCOLATE PRODUCT

(71) Applicant: Generale Biscuit, Clamart (FR)

(72) Inventors: Jean Luc Rabault, Clamart (FR); Francois Belouin, Clamart (FR)

(73) Assignee: Generale Biscuit, Clamart (FR)

( * ) Notice: Subject to any disclaimer, the term of this patent is extended or adjusted under 35 U.S.C. 154(b) by 187 days.

(21) Appl. No.: 17/507,791

(22) Filed: Oct. 21, 2021

(65) Prior Publication Data
US 2022/0039423 A1 Feb. 10, 2022

Related U.S. Application Data

(62) Division of application No. 16/941,402, filed on Jul. 28, 2020, now Pat. No. 11,178,886, which is a division of application No. 15/506,969, filed as application No. PCT/EP2015/070750 on Sep. 10, 2015, now Pat. No. 10,757,956.

(30) Foreign Application Priority Data

Sep. 10, 2014 (EP) .................................. 14184279.9

(51) Int. Cl.
| | |
|---|---|
| A23G 3/34 | (2006.01) |
| A21D 13/38 | (2017.01) |
| A21D 13/32 | (2017.01) |
| A23G 1/54 | (2006.01) |
| A23D 7/005 | (2006.01) |
| A23D 7/01 | (2006.01) |
| A23D 9/013 | (2006.01) |
| A23D 9/007 | (2006.01) |

(52) U.S. Cl.
CPC ........... *A23G 3/0065* (2013.01); *A21D 13/32* (2017.01); *A21D 13/38* (2017.01); *A23D 7/0053* (2013.01); *A23D 7/011* (2013.01); *A23D 9/007* (2013.01); *A23D 9/013* (2013.01); *A23G 1/54* (2013.01); *A23G 3/346* (2013.01); *A23V 2002/00* (2013.01)

(58) Field of Classification Search
None
See application file for complete search history.

(56) References Cited

U.S. PATENT DOCUMENTS

| | | | |
|---|---|---|---|
| 3,185,576 | A | 5/1965 | Ross |
| 4,753,812 | A | 6/1988 | Wilson |
| 5,554,408 | A | 9/1996 | Cain |
| 5,762,990 | A | 6/1998 | Eiko |
| 8,182,857 | B2 | 5/2012 | Cleenewerck |
| 2005/0214435 | A1 | 9/2005 | DesBois |
| 2008/0248186 | A1 | 10/2008 | Bruse |
| 2010/0136182 | A1 | 6/2010 | Rabault |
| 2010/0215811 | A1 | 8/2010 | Favre |
| 2011/0091636 | A1 | 4/2011 | Elleman |

FOREIGN PATENT DOCUMENTS

| | | |
|---|---|---|
| EP | 0777971 | 6/1997 |
| EP | 1736059 | 12/2006 |
| EP | 1862077 | 12/2007 |
| EP | 3005875 | 4/2016 |
| EP | 3190896 | 7/2017 |
| GB | 976389 | 11/1964 |
| WO | 2006136536 | 12/2006 |
| WO | 2007090477 | 8/2007 |
| WO | 2008138970 | 11/2008 |
| WO | 2009013473 | 1/2009 |
| WO | 2012031119 | 3/2012 |

(Continued)

OTHER PUBLICATIONS

"Calorieen in LU Petit Beukelaer en Voedingswaarde Informatie"; https://www.fatsecret.be/calorie%C3%ABn-voedingswaarde/lu/petit-beukelaer/1-biscotto (1 pg.).
"Chocolate Cups Type", Chocolate Masters for Professionals Brochure, (19980000), p. 313.
"Element 2: Prepare chocolate based fillings, coatings and decorations", anonymous, Prepare chocolate and produce chocolate products. Trainee Manual, ASEAN, (20130000), pp. 23, 28, 30-33, 71, XP055558208.
Fat and Oil Melt Point Tmperatures; http://www.veganbaking.net/articles/tools/fat-and-oil-melt-point-temperatures; Posted in 2015 (7 pgs.).

(Continued)

*Primary Examiner* — Jyoti Chawla
(74) *Attorney, Agent, or Firm* — Fitch, Even, Tabin & Flannery LLP

(57) ABSTRACT

The present invention provides a method for preparing a filled bakery product, the method comprising:
  providing a filling composition comprising at least one powdered food ingredient and a fat blend comprising from 15 to 67 wt. % of a temper hard fat and from 85 to 33 wt. % of a liquid oil,
  tempering the filling composition to form a tempered filling composition,
  depositing the tempered filling composition on to at least one surface of a bakery product to form a filled bakery product, wherein the surface of the bakery product has a temperature of less than 36° C., and
  actively cooling the deposited filling composition,
  wherein in the step of depositing the tempered filling composition, the tempered filling composition is deposited at a deposition temperature of from 20 to 33° C. and, in the step of actively cooling the deposited filling composition, the deposited filling composition is cooled to a temperature of at least 4° C. below the deposition temperature,
  wherein the temper hard fat has a solid fat content of at least 60 wt. % at 20° C.,
  wherein the liquid oil has a solid fat content of less than 15 wt. % at 20° C., and
  wherein the fat blend has a saturated fatty acid residue content of from 16 to 42 wt. % and a polyunsaturated fatty acid residue content of less than 40 wt. %, based on the total weight of fatty acid residues of the fat blend.

13 Claims, 1 Drawing Sheet

(56) References Cited

FOREIGN PATENT DOCUMENTS

| WO | 2012089676 | 7/2012 |
|---|---|---|
| WO | 2016038155 | 3/2016 |

OTHER PUBLICATIONS

"Industrial Chocolate Manuifacture and Use" Second Edition; Edited by S.T. Beckett; 1994 (4 pgs.).
"Manual 5—Secondary proessing in biscuit manufacturing"; Edited by Duncan Manley; 1998, Chapter 6—Cream Sandwiching (9 pgs.).
"Professional Technical Theory Training Textbook of Advanced Chinese Cooking Chef", Food and Beverage Service Group of Commerical Management Committee of Henan Province, Henan Science and Technology Press, Jun. 30, 1995, p. 50.
"The Science of Chocolate" 2nd Edition; Edited by S. T. Beckett; 2008 (13 pgs).
"The Science of Chocolate" 2nd Edition; Edited by S. T. Beckett; 2008 (pp. 184-185).
Amendment dated Dec. 3, 2018 in response to Communication pursuant to Article 94(3) EPC, dated May 25, 2018 for EP Application No. 15763297.7 (30 pgs.).
Amendment dated Jun. 5, 2019 in response to Communication pursuant to Article 94(3) EPC, dated Nov. 26, 2018 (15 pgs.).
Amendment dated Oct. 28, 2019 in response to Communication pursuant to Article 94(3) EPC, dated Apr. 18, 2019 for EP Application No. 15763297.7 (47 pgs.).
Certificate of Analysis—"Non-deoderized inter-esterified sunflower oil", 2005 (enzymatic SOS-fat with IV 33,7) (1 pg.).
Communication pursuant to Article 94(3) EPC dated Apr. 28, 2019; for European Patent Application No. EP15763297.7 (5 pgs.).
Communication pursuant to Article 94(3) EPC dated Jan. 3, 2020, for EP Application No. 15763297.7 (7 pgs.).
Communication pursuant to Article 94(3) EPC dated May 25, 2018, for EP Application No. 15763297.7 (6 pgs.).
Communication pursuant to Article 94(3) EPC dated Nov. 26, 2018, for EP Application No. 14184279.9 (4 pgs.).
Datasheet—Article-No. 10230 for Sonnin 10230, revision date Feb. 27, 2014 (2 pgs.).
Directive 2000/36/EC European Parliament related to cocoa and chocolate; App. No. EP3005875 (11 pgs.).
Duncan Manley, "Enrobing biscuits", Manual 5—Secondary processing in biscuit manufacturing, Woodhead Publishing Ltd., (19980000), pp. 28-29, 42, 52; XP055558202.
European Patent Office Communication from the Examining Division and Annex to the Communication; dated Jun. 12, 2019; for European Patent Application No. EP16712260.5 (2 pgs).
European Patent Office Communication from the Examining Division, dated Mar. 3, 2017; for European Patent Application No. 14184279.9 (5 pgs.).
European Patent Office Communication from the Examining Division; dated Feb. 15, 2018; for European Patent Application No. 14184279.9 (5 pgs.).
European Patent Office Communication from the Examining Division; dated Sep. 11, 2017; for European Patent Application No. 14184279.9 (5 pgs.).
European Patent Office Examiniation Report dated Jun. 9, 2019; App. No. EP14184279.9 (5 pgs.).
Examiner's Opinion for Application No. EP14184279 (5 pgs.).
Geoff Talbot, Science and technology of enrobed and filled chocolate, confectionery and bakery products, CRC, (20090000), pp. 61, 62, 91, 111, 114, 117, 135, 236, 237, 278-281, XP055558194.
Gunstone, Frank D.; Excerpt from "Lipid Technologies and Applications"; 1997 (3 pgs.).
Gupta, et al. "Determination of Iodine Numbers of edible oils" obtained from Biochemical Education 1994 (1 pg.).
Hu Deliang, et al. "Food Emulsifiers", China Light Industry Press Ltd., Aug. 31, 2011, p. 307.

International Search Report and Written Opinion of the International Searching Authority, dated Oct. 23, 2015 for International Application No. PCT/EP2015/070750 (14 pgs.).
Lonchampt, Pierre, et al.; "Fat bloom in chocolate and compound coatings"; European Journal of Lipid Science and Technology; vol. 106, 2004 (2 pgs.).
Lu Petit Beukelaer "Dry Biscuits"; Mintel; http://www.gnpd.com; Dec. 2014 ( 3 pgs.).
Mintel; Jul. 2014, Anonymous: "Dark Chocolate Filled with Salted Butter Caramel" (3 pgs.).
Mintel; May 2014, Anonymos: "Belgian Chocolates with Milk Chocolate Truffle Filling" (2 pgs.).
Mintel; May 2014, Anonymous: "Chocolate Sandwich Cookies with a Strawberry Flavoured Cream Filling" (3 pgs.).
Mintel; Nov. 2013, Anonymous: "All Chocolate Sandwich Biscuits" (2 pgs.).
Notification of the First Office Action dated Aug. 24, 2019; App. No. CN201580048002.0 (21 pgs.).
Notification of the Second Office Action dated May 22, 2020; App. No. CN201580048002.0, with English tranlsation (25 pgs.).
Partial European Search Report, dated Mar. 4, 2014 for Application No. EP14184279 (5 pgs.).
Perez-Marti Nez, et al., "The cooling rate effect on the microstructure and rheological properties of blends of cocoa butter with vegetable oils" Food Research International, vol. 40, No. I, Nov. 15, 2006, pp. 47-62 (16 pgs.).
Reply dated Jan. 15, 2020 in response to Communication pursuant to Article 94(3) EPC, dated Sep. 6, 2019 for EP Application No. 14184279.9 (13 pgs.).
Reply dated Jan. 17, 2018 in response to Communication pursuant to Article 94(3) EPC, dated Sep. 11, 2017 for EP Application No. 14184279.9 (15 pgs.).
Reply to European Patent Office Feb. 15, 2018 Communication from the Examining Division, dated Aug. 24, 2018; for European Patent Application No. 14184279.9 (7 pgs.).
Reply to European Patent Office Mar. 3, 2017 Communication from the Examining Division; dated Jul. 12, 2017; for European Patent Application No. 14184279.9 (17 pgs.).
Reply to European Patent Office Sep. 11, 2017 Communication from the Examining Division, dated Jan. 17, 2018; for European Patent Application No. 14184279.9 (14 pgs.).
S. T. Beckett, "Milk based ingredients", Industrial Chocolate Manufacture and Use, Blackie Academic & Professional, (19940000), p. 48, 49, 78; XP055558216.
Talbot G., et al., "Biscuitine TM 580—processing convenience at optimal nutritional profile" Inovations in Food Technology, No. 45, Jan. 1, 2009, pp. 58-59.
Talbot G., et al., "Latest developments in confectionery fats" Innovations in Food Technology, No. 51, Jan. 1, 2011, pp. 44-46.
Third Party observations under Article 115 EPC dated Aug. 28, 2019; App. No. EP14184279.9 (8 pgs.).
Third Party observations under Article 115 EPC dated Jan. 2, 2020; App. No. EP15763297.7 (7 pgs.).
Third Party Observations Under Article 115 EPC; dated Jan. 25, 2019; for European Patent Application No. EP15763297.7 (25 pgs.).
Third Party Observations Under Article 115 EPC; dated Mar. 5, 2020 for EP Application No. 14184279.9 (11 pgs.).
Third Party Observations Under Article 115 EPC; dated Sep. 16, 2020; for European Patent Application No. EP14730191.5 (42 pgs.).
Third Party Observations Under Article 115 EPC; dated Sep. 3, 2018; for European Patent Application No. EP14184279.9 (15 pgs.).
Timms, Ralph E.; "Confectionary Fats Handbook Properties, Production and Application"; 2003 (4 pgs.).
Tuo Tuo Ma, "Handmade Healthy Baking of my Baby and Me", LiaoNing Science and Technology Publishing House, May 31, 2013, pp. 36-38.
Typical Fatty-Acid Compositions of Some Common Fats (adapted from Gunstone, F. Fatty Acid and Lipid Chemistry; Blackie: London, 1996 (2 pgs.).
Young, F.V.K. Palm Kernel and Coconut Oils: Analytical Characteristics, Process Technology and Uses; Published in 326A/JAOCS, vol. 60, No. 2 (Feb. 1983) pp. 374-379.

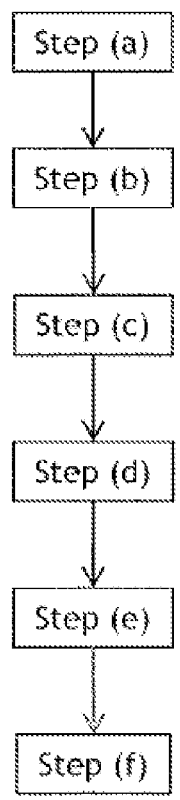

FILLING FOR A BAKERY OR CHOCOLATE PRODUCT

CROSS REFERENCE TO RELATED APPLICATIONS

This application is a division of U.S. patent application Ser. No. 16/941,402, filed Jul. 28, 2020, which is a divisional of U.S. application Ser. No. 15/506,969, filed Feb. 27, 2017, now U.S. Pat. No. 10,787,956, issued Sep. 9, 2021, which is a U.S. national phase application of International Application No. PCT/EP2015/070750, filed Sep. 10, 2015, which claims benefit from European Application 14184279.9, filed Sep. 10, 2014, which are each hereby incorporated herein by reference in their entirety.

FIELD

The present case relates to a method for forming a filled bakery or chocolate product, in particular, a healthy filling having a low saturated fat content. More particularly, it relates to a filled biscuit product, in particular a sandwich-type, or a filled chocolate product, and to a fat blend for providing a healthier filling for the biscuit or for chocolate products while retaining a desirable firm texture.

BACKGROUND

Biscuit or cookie products are a popular snack food and, in particular, there is a large market for layered biscuit products having a varied texture and taste provided by a filling. It is known to provide a range of fillings including emulsion fillings and anhydrous fat-based fillings. These provide a desirable mouth feel and are popular commercial products.

However, the fillings include a fat ingredient in order to provide a workable composition and a firm final layer within the product. The use of saturated fats in these fillings is in particular required to provide a sufficient firmness, a nice melting and flavour release. However, saturated fats are known to give rise to health issues and it is desirable to reduce the amount of such fats from the diet.

Fat blends and their use in fillings are well known in the art and are discussed in WO2009013473, U.S. Pat. Nos. 8,182,857, 5,762,990 and WO2006136536.

WO2007090477, in particular, discloses a filling formed from a fat blend comprising a hard fat and a liquid oil. WO2007090477 discloses anhydrous fillings containing more than 36 wt % fat. WO2007090477 also indicates that the saturated fat (safa) content of greater than 25 wt % is required to provide the solid or semi-solid texture necessary for a filling.

SUMMARY

Therefore, one aim is to provide a fat filling that has the same organoleptic properties and firmness required for use in a filled bakery product, which improving the healthiness of the filled bakery product, or which at least provides a method for providing a filling that tackles the drawbacks associated with the prior art, or provides a commercially useful alternative to known methods or products.

Accordingly, in a first aspect there is provided a method for preparing a filled bakery product, the method comprising:
providing a filling composition comprising at least one powdered food ingredient and a fat blend comprising from 15 to 67 wt. % of a temper hard fat and from 85 to 33 wt. % of a liquid oil,
tempering the filling composition to form a tempered filling composition,
depositing the tempered filling composition on to at least one surface of a bakery product to form a filled bakery product, wherein the surface of the bakery product has a temperature of less than 36° C., and
actively cooling the deposited filling composition,
wherein in the step of depositing the tempered filling composition, the tempered filling composition is deposited at a deposition temperature of from 20 to 33° C. and, in the step of actively cooling the deposited filling composition, the deposited filling composition is cooled to a temperature of at least 4° C. below the deposition temperature,
wherein the temper hard fat has a solid fat content of at least 60 wt. % at 20° C.,
wherein the liquid oil has a solid fat content of less than 15 wt. % at 20° C., and
wherein the fat blend has a saturated fatty acid residue content of from 16 to 42 wt. % and a polyunsaturated fatty acid residue content of less than 40 wt. %, based on the total weight of fatty acid residues of the fat blend.

The present disclosure will now be described further. In the following passages different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

The present disclosure relates firstly to a method for preparing a filled bakery product. Bakery products are well known and are made from a dough (typically viscous) or a batter (generally more liquid) which is baked or cooked, preferably by being baked in an oven. Depending on the inclusion of water and/or the inclusion of polyols, they can be considered as:
"dry" (typically having less than 5 wt % moisture and are hard and crunchy/crispy); or
"soft" (typically containing more than 5 wt % moisture, and generally having an Aw of below 0.85. Such soft portions often include added polyols, in particular if their Aw is below 0.8). By soft it is meant that they can be very soft or just not crunchy/crispy. They will be named herein "soft cakes".

Dry biscuits includes biscuits (in Europe), cookies (in US), crackers, wafers, and baked granola bars.

Soft cakes includes preferably cakes, cupcakes, sponge cakes, soft bars, brownies, but also brioche, croissants, buns, muffins, Swiss rolls, patisserie products such as tarts, plaits, and swirls, pain au chocolat, macaroons, flapjacks, doughnuts, pies, scones, éclairs, Mille-feuille, puddings, flans, tortes, pancakes and profiteroles.

Preferably the bakery product is a layered biscuit (which may be dry or soft), preferably a sandwich biscuit, or a single biscuit with filling lying on one surface or inside thereof.

By a filled bakery product it is meant that the bakery product is provided with a filling or coating layer on at least one surface, within a cavity (open or closed) or linking two or more bakery products together. For example, a sandwich biscuit may be considered as filled because the filling is provided between two biscuit portions. Equally, a croissant may be provided with a filling enclosed within the cone shape portion of the product or applied as a layer around a portion of the outer surface. Other filled products, for example, include "wafer books", which have several wafer sheets separated by filling layers.

The inventors sought to provide a healthier filling for such products. In particular, they sought to provide a filling without palm oil and/or with reduced saturated fat, while not increasing the production costs and while maintaining a "clean label" (no animal fats, no hydrogenated fat, no E number, and no interesterification). Furthermore, the filling would need to maintain consumer appeal.

The saturated fat of conventional filling compositions may be from 45 to 100 wt % of the fat component. This gives rise to a good texture (hardness, plasticity, heat resistance), good processability (aeration, crystallization speed), a good melting profile (no waxiness) and flavour release. Accordingly, simply reducing the saturated fat content would jeopardize these beneficial characteristics of the filling.

Many conventional fillings are made using palm oil as it provides a good texture. However, as explained below, certain consumers may consider palm oil to be undesirable in a filling composition. Palm is a cheap oil with a lot of technical interest. It is a plastic solid at room temperature, and can be used to provide a large range of texture due to easy fractionation (for instance selecting olein for softer or stearin for harder formulations). It also has a pleasant melting profile in mouth, a very neutral taste, and it is very stable to oxidation. However, it is considered to be undesirable for social, environmental and nutritional reasons. It is implicated in significant deforestation. It is also rich in saturated fats, very rich in palmitic acid, which is generally considered to be worse than other saturated fatty acids (especially stearic) for cardiovascular diseases, and is the highest source of neoformed carcinogenic components (3-MCPD).

Accordingly, the inventors sought to reduce the saturated fat in a filling while avoiding the use of palm oil. However, those fats which are low in saturated fatty acid chains are liquid oils based mainly on unsaturated fatty acids containing 18 carbons (C18), like canola, sunflower (regular or oleic), soy, cottonseed, olive. Oleic sunflower oil (containing 8% Safa) has successfully been used to replace palm (containing 45% to 50% Safa) in crisps. However, these fats are liquid at 20 to 25° C. (most of them are even liquid at refrigerated temperature), so cannot be used in fillings, where solid fat is the main contributor to processability, and/or texture and/or flavour release.

Accordingly, the inventors investigated the available solid fats. However, these are limited in number and have a number of substantial draw-backs such as expense or hydrogenation, high safa levels, unacceptability for health or religious reasons (especially animal fats), or having too high a melting point such that they do not melt in the mouth.

The solution found by the inventors and described herein was to provide a specific blend of a temper hard fat and a liquid oil (low in safa) which was found, when properly crystallised according to the methods described herein, to surprisingly give a suitable texture even with very low levels of the temper hard fat. The fat blends described herein for use in forming fillings have a large number of advantages including excellent technical properties: very quick crystallization; good stickiness (important to adhere sandwich biscuits together); and high stability upon storage between 18 and 30° C. without fat bloom or fat separation. They also provide excellent organoleptic properties: they have a desired hardness (solid) at 20, 25 and 30° C., a good heat resistance up to 29 to 34° C., and an outstanding melting profile (like chocolate): sharp melting above 30° C. and fully melted at 37° C., such as in the mouth. This is much better than non-tempered fats with low safa (which have waxiness and higher viscosity at mouth temperature). The sharp and full melting at mouth temperature (typically 36-37° C.) enables a fat saving of about 10% for the same viscosity, compared with non-tempered classical fat shortenings (not reduced in saturated fat). This 10% fat saving contributes to make the filling healthier directly (by the use of less fat) and indirectly (since 10% less fat further reduces the total saturated fat by 10%).

Typically, temper hard fats based on hard shea butter fractions, Illipe or Mango kernel for instance, cost about six times as much as palm oil, and have very different textures, so that people have no incentive to replace palm oil with them. Also any filling for a bakery product is normally based on non-temper fats which are simple to process.

Although temper hard fats are very expensive, the method described herein allows a decrease in the overall cost because: (1) the fat blend maximizes the oil content and minimises the hard temper fat for the target texture; and (2) it is possible to use less total fat in the filling (about 10% less fat) and less cocoa powder and/or flavouring components, due to the outstanding melting properties when consumed.

It is also noted that the fat blend provides flexibility. By adjusting the blend of the two fats it is possible to control the hardness to very different products requirements (e.g. from 500 g to 10000 g of penetrometer).

The utility of the fat blend described herein was particularly surprising because it was expected that temper fats like cocoa butter (CB) or cocoa butter equivalent (CBE) would be incompatible with a lot of fats, including lauric fats and liquid oils. For instance, oil migration (e.g. rapeseed or sunflower oil) from a biscuit into chocolate is notably known to make it bloom, especially when there is no Anhydrous Milk Fat (AMF) inside the chocolate: this is due to the destabilisation of the CB solid fat network by the liquid oil. In addition, too much foreign fat in cocoa butter is known to inhibit chocolate tempering. Without good tempering, the cocoa butter will crystallize slowly and then bloom within a few days or weeks.

Instead, the inventors were surprised to see that they could dilute the temper hard fat with large amounts (up to 85 wt % of the liquid oil) and still obtain a sufficiently solid filling. Differential scanning calorimetry (DSC) analysis can be used to investigate the fat properties in the final composition. The DSC analysis shows that where a liquid oil having 0% SFC at 20° C. (like canola oil) is used in the fat blend, the oil is not solid in the final product at 20° C. Without wishing to be bound by theory, it is thought that it is just entrapped within the temper hard fat network. Indeed, even oils with a lot of polyunsaturated fatty acids with 2 or 3 double bonds (sunflower or canola) can be used without giving more perturbation in crystallization and shelf life than oleic oils (hazelnut or high oleic sunflower).

The method firstly involves the provision of a filling composition. A filling composition is one which has a desirable flavour and mouth feel. Such fillings typically include fat, sugar and a flavouring, such as a chocolate, hazelnut, coffee, strawberry, mint or vanilla flavouring. It can also be a savoury filling, with for instance, tomato or cheese powders and flavours. Such flavourings are well known in the art.

The filling composition described herein is prepared from a fat blend, together with at least one powdered food ingredient and, optionally water or water-containing ingredients (liquid glucose syrup, honey, concentrated milk and the like). The presence of added water (and optionally other liquid hydrophilic ingredients within the aqueous phase) will depend on whether the filling is an emulsion filling or an anhydrous filling.

Preferably the filling composition is prepared by adding the at least one powdered food ingredient into the at least partially melted fat blend. Alternatively, the filling may be provided by adding separately the oil and hard fat during a mixing step with the powders. That is, the fat blend may be formed in-situ, rather than being formed prior to addition to the filling.

An anhydrous filling is any concentrated suspension of solid particles ("dry" powdered ingredients) in a continuous fat phase which is not a water-in oil emulsion (the suspension may be more readily seen when the fat is melted). When the fats and oils making the continuous phase are melted and not intentionally aerated, the filling described herein preferably has a homogeneous texture, either liquid or more viscous (but still pumpable), such as a batter or a dough. The filling is not powdery or crumbly (such as a wet sand texture). Anhydrous fillings do not include added water, either directly or indirectly (for instance through liquid glucose syrup or liquid honey for instance). An anhydrous filling contains substantially no water (i.e. has a moisture content of less than 6 wt. %, preferably less than 3 wt %) and most of its water is contained within its solid particles, like vegetable fragments (cocoa powder, starch and the like), dried powders (milk and the like), or crystals with crystallisation water (dextrose monohydrate, lactose monohydrate and the like). An anhydrous filling contains substantially no added liquid polyols such as glycerol, propylene glycol and the like (i.e. less than 3 wt %, preferably less than 1 wt %, more preferably 0). Anhydrous fillings typically have a water activity (Aw) of less than 0.6, preferably less than 0.5, and are frequently used in "dry" biscuits (like in "dry" sandwich biscuits or "dry" filled biscuits) or in filled chocolate because they do not soften the "dry" base biscuit. Anhydrous filling can also, in some cases, be used in soft cakes, but if the filling quantity is large, the soft cake will becomes less soft over time due to moisture pick up by the filling.

The water activity (Aw) of a product is a notion which is well known in the food industry field. This value measures the availability of water in a sample. In most cases, this water activity is not proportional to the water content of the product.

Methods for measuring Aw of a product are known to the person skilled in the art. For example, it can be measured with an Aqualab CX-2 or series 3, or a Novasina. All Aw values indicated hereafter are measured at 25±0.2° C.

Common anhydrous fillings may include yoghurt or live cultures to provide additional taste and health benefits.

An emulsion-based filling, which contains fats and water (or other liquid anhydrous but hydrophilic food grade ingredients such as liquid anhydrous polyols: glycerol, propylene glycol and the like), is a dispersion comprising at least one lipid phase and at least one aqueous (hydrophilic) phase. The lipid phase (which is herein also referred to as a fat phase) can be predominantly solid or predominantly liquid (or entirely solid or entirely liquid) depending on temperature. The emulsion can further comprise solid particles, like insoluble particles (cocoa powder, non-gelatinised starch, or the like) or icing sugar, for instance, if the concentration exceeds the maximum solubility. Emulsion fillings for products having a shelf life of several months (non-frozen) typically have an Aw 0.6-0.85. They are used in soft cakes, especially fillings used to stick two cakes into sandwich soft cakes, and in chocolate shells. Emulsion fillings could also be used in dry biscuits products if the filling Aw is below 0.55, preferably below 0.4. For a shorter shelf life or when a suitable preservation system is used, the Aw of the filling according to the invention could be higher, for example from 0.85 to 0.98, preferably 0.85 to 0.93.

The preparation of emulsion fillings includes adding water or liquid water containing ingredients (and/or liquid anhydrous hydrophilic ingredients such as anhydrous liquid polyols) and usually emulsifiers to stabilise the emulsion. These fillings may include a continuous lipid phase (with a dispersed hydrophilic phase), or a continuous hydrophilic phase (with a dispersed lipid phase) or bicontinuous phases (for instance with regions having a continuous lipidic phase, and other regions having a continuous hydrophilic one). It can also include more complex emulsions like multiple emulsions.

The aqueous hydrophilic phase usually comprises water and/or liquid anhydrous polyols (glycerol, propylene glycol), dissolved powders (such as solid polyols like sorbitol, sugars, milk, or the like), and sometimes suspended hydrophilic solid particles (crystalline sugars, non-gelatinised starch or the like). The nature of the continuous phase is driven by the formulation (volume ratio of lipidic to hydrophilic phases; nature and quantity of emulsifiers, or the like) but also by the process (incorporation sequence of ingredients, shear, temperature, or the like). Preferred emulsion fillings according to the method and compositions disclosed herein are those wherein lipids form mainly a continuous phase through at least part of the filling, more preferably throughout the whole filling. This is because in such cases, the properties of the fat have a higher contribution to the texture; they can be used for instance in soft cakes and chocolate shells. In other cases, for instance where one would want to prevent oil migration, a continuous hydrophilic phase may be preferred.

A filled bakery product may contain two or more fillings, including, for example, an emulsion and an anhydrous filling. One or more, preferably all, of these fillings may be provided as described herein. The fillings are preferably provided as distinct filling portions.

Edible oils and fats usually contain primarily a complex mixture of triglycerides, the remainder being predominantly monoglycerides and diglycerides which arise as a result of the partial hydrolysis of the fat or oil, or as a result of specific chemical reactions like interesterification or as a result of in purpose addition of monoglycerides and diglycerides emulsifiers. Each triglyceride is a triester of glycerol and any of several fatty acids. Fatty acid "residues" refers to the total of free fatty acids (in very limited amount in refined food grade fats and oils) and of the fatty acids engaged in ester bonds such as when bound to the glycerol backbone. Owing to the mixture of components present in any given fat, fats do not have exact melting points but have a melting range. The term "hard fat" as used herein refers to a fat that is predominantly solid at room temperature (i.e. 20 to 25° C.), while the term "liquid oil" refers to a fat that is predominantly liquid at room temperature. The term "fat blend" refers to a mechanical blend or mixture of two or more fats, i.e. without chemical reaction like interesterification in between the two fats.

Mono-, di- and triglycerides mixtures are polymorphic when they crystallize in different crystal forms, denoted as $\gamma$, $\alpha$, $\beta$ prime and $\beta$, in order of increasing stability (thermodynamics) but of decreasing facility to be formed (kinetics): for instance, beta prime crystals form sooner/more easily than beta crystals (kinetics, due to lower activation energy), but are less stable thermodynamically and have the tendency to be converted over time into beta, leading to fat bloom or fat separation in big white dots for instance. All these crystal forms differ in their melting points and crystallographic properties (packing density and the like). A temper fat is one which is most stable in the β-form (crystal form type V or VI as defined by Wille & Luton): if not crystallised properly with a tempering process, it will first crystallise slowly, in unstable crystal forms, then recrystallize over time in more stable forms, bringing changes in texture and in appearance (fat bloom).

On the contrary, a non-temper fat will crystallise, from the fully melted form, spontaneously, usually more rapidly, and in a form which will remains stable for a long time, without the need of a specific tempering process to select specific polymorphs. These non-temper fats are generally thought to crystallise in beta prime form and stay in that metastable form for a long time, even if their most thermodynamic form could ultimately be beta.

The fat blend comprises from 15 to 67 wt. % of a temper hard fat. Preferably the fat blend comprises the temper hard fat in an amount of from 15 to 60 wt. %, preferably from 15 to 50 wt. %, preferably from 15 to 40 wt. %, preferably from 15 to 30 wt. %, more preferably from 15 to 27 wt. % and still more preferably from 15 to 25 wt. % and even more preferably 20 to 25 wt. %. The preferred temper hard fats include cocoa butter (CB), Cocoa Butter Equivalent (CBE) or CBI (Cocoa Butter Improver), and mixtures thereof.

CBE are fats, cheaper than CB, with physical properties (including crystallisation) close to CB, and which are miscible with CB in each proportion without altering too much of the CB properties. They are for instance defined according to current EU regulation when they are for use in chocolate (at maximum 5%) while maintaining the standard of identity to name it "chocolate". CBI is a specific class of CBE, being harder than CB itself; they are usually used (at maximum 5%) in milk chocolate sold in hot countries to have a product a bit harder when partly melted for instance at 30-31° C.

They are also fats which technically are CB, CBE or CBI, but are obtained in a way not allowed by the various local chocolate regulations/Codex (because of other vegetable origin, due to too much specific minor lipid components or due to the use of interesterification for instance): if they are used, even at less than 5%, the product cannot be labelled chocolate. For the purpose of this patent, when we speak about CB, CBE or CBI, we also include the fats which have these characteristics but do not comply with regulations for use in chocolate standard of identity.

The most preferred temper hard fat are CBI, more preferably those with the highest melting point, for instance based on 100% shea butter stearin: these fats do not melt in mouth when pure (they are fully melted at about 41° C.). Preferably the CBI have a SFC at 35° C. of at least 10%, preferably at least 20%, more preferably at least 40%, even more preferably at least 50% and ideally at least 60%.

The temper hard fat will have a solid fat content (SFC) of at least 60 wt. % at 20° C., preferably at least 70% and preferably at least 80%. At temperatures close to ambient, most hard fats used in food, although they seems solid, are partly solid and partly liquid. Solid fat content measurements are well known in the art and are used to describe how much solid the fat has at the particular measurement temperature in order to estimate its melting profile for instance. SFC are measured according to the IUPAC measurement standard 2.150 (b) for temper fats (including the temper hard fat discussed herein) and to 2.150 (a) for non-temper fats (including the liquid oil discussed herein).

One way to describe components of a fat blend is with a "Ratio A". This is the proportion of saturated fatty acid residues having 16 or fewer carbon atoms relative to the total number of saturated fatty acid residues of the temper hard fat. Preferably the temper hard fat has a ratio A of less than 50%, preferably less than 45%, more preferably less than 38%, more preferably less than 30%, still more preferably less than 20% and most preferably from 1 to 10%.

Preferably the fat blend has also a ratio A of less than 50%, preferably less than 45%, more preferably less than 38%, more preferably less than 30%, still more preferably less than 20% and most preferably from 1 to 10%.

Preferably the temper hard fat has a SUS-triglyceride content of at least 60 wt. %, preferably at least 70 wt. %, more preferably at least 75 wt %, more preferably at least 80 wt. %, more preferably at least 85 wt %, still more preferably at least 90 wt. %, most preferably from 95 to 99 wt. %. S means a saturated fatty acid, U means an unsaturated fatty acid, and an SUS-triglyceride is a triglyceride having two saturated fatty acids (which can be identical or different in chain length) at the 1- and 3-positions and an unsaturated fatty acid at the 2-position on the glycerol backbone. Such a triglyceride is symmetrical, in contrast to an unsymmetrical SSU-triglyceride.

Preferably at least 50 wt % of the SUS-triglyceride content is provided by SOS-triglycerides, wherein O is oleic acid, more preferably at least 60 wt %, still more preferably at least 70 wt %, more preferably at least 80 wt % and most preferably at least 90 wt %.

Preferably, most of the total saturated fatty acid residues present in the temper hard fat have a carbon chain length of 16 to 24, more preferably from 18 to 24, more preferably still from 18 to 22. Saturated fatty acid residues of such carbon length may be present in an amount of at least 80 wt %, preferably at least 90 wt %, more preferably still at least 95 wt % and most preferably at least 99 wt %.

Preferably the temper hard fat has a diglyceride content of less than 10 wt. %, preferably less than 5 wt. %, more preferably less than 3 wt. %, and preferably less than 1 wt. %.

Preferably the temper hard fat is a shea stearin, preferably having a SUS-triglyceride content of at least 75 wt. %, preferably at least 85 wt. % and even more preferably of at least. 90 wt. %.

The fat blend comprises from 85 to 33 wt. % of a liquid oil. Preferably the fat blend comprises the liquid oil in an amount of from 85 to 40 wt. %, preferably from 85 to 50 wt. %, preferably from 85 to 60 wt. %, preferably from 85 to 70 wt. %, more preferably from 85 to 73 wt. % and still more preferably from 80 to 75 wt. %.

The liquid oil is preferably selected from the group consisting of canola oil, rapeseed oil, sunflower oil, soy oil, peanut oil, corn oil, cottonseed oil, olive oil, and mixtures of two or more thereof. More preferably, the liquid oil is native and/or regular oil from canola or soy, or a mixture thereof. Less preferred oils include oils extracted from grape seeds, hazelnut or other nut oils, linseed, rice bran oil, safflower, sesame, liquid fractions of palm oil or liquid fractions of shea butter, liquid algae oil or diglyceride liquid oil. All these oils could be native (including generally Refining, Deodorisation and Bleaching) or modified physically or chemically by fractionation or interesterification for instance, and are used alone or in mix.

Note than canola and rapeseed are very close in composition, and can be interchanged within the scope of this disclosure. Canola is the term used in America, where the term rapeseed is in Europe, for instance.

The solid fat content of the liquid oil is less than 15 wt. % at 20° C., more preferably less than 10 wt %, more preferably less than 5 wt % and most preferably about 0 wt %.

The fatty acid composition of the liquid oils of the present disclosure can be regular, i.e. not modified by conventional breeding or GMO techniques or on the contrary modified to get a different fatty acid composition like high oleic varieties, i.e. enriched in oleic acid residues. "High oleic" oil varieties are commercially available and are obtained, for example, by selective breeding of the plants from which they are derived. Alternatively, the liquid oils may be modified by other means, such as inter-esterification, which is a process whereby fatty acids positions are moved within the same triglyceride molecule, and/or moved from one triglyceride molecule to another. Inter-esterification is commonly performed to modify the melting profile of a fat. Preferably, the liquid oils are not chemically modified by hydrogenation or interesterification for instance. Suitable liquid oils include oleic canola, oleic rapeseed or oleic sunflower oil. Preferably the fat blend does not comprise palm oil nor palm kernel oil.

The fat blend has a saturated fatty acid residue content of from 16 to 42 wt. %, based on the total weight of fatty acid residues of the fat blend. A saturated fatty acid residue is a fatty acid residue containing no carbon-carbon double bonds. Preferably the fat blend has a saturated fatty acid residue content of from 16 to 35 wt. %, preferably from 16 to 30 wt. %, more preferably from 16 to 25 wt. %, and from 17 to 23 wt. %, based on the total weight of fatty acid residues of the fat blend.

Preferably the saturated fat content of the filling, whether anhydrous or emulsion, is less than 12 wt % relative to the total weight of filling, more preferably less than 10 wt. %, more preferably less than 8 wt. % and most preferably less than 6 wt. % per 100 g of filling. Preferably the total fat content of the fillings is less than 40 wt %.

The fat blend has a polyunsaturated fatty acid residue content of less than 40 wt. %, based on the total weight of fatty acid residues of the fat blend. A polyunsaturated fatty acid residue is a fatty acid residue containing at least two carbon-carbon double bonds. Preferably the fat blend has a polyunsaturated fatty acid residue content of from 10 to 40 wt. %, preferably from 10 to 30 wt. %, more preferably from 15 to 25 wt. %, based on the total weight of fatty acid residues of the fat blend. This provides a good balance between nutritionally recommended levels (since this may provide the only two essential fatty acids: linoleic and alpha linolenic fatty acids) and avoiding too much oxidation sensitivity.

One of the main factor influencing oxidation is storage temperature. In order to limit oxidation, the liquid oil is preferably added to the temper hard fat just before using it to make the fillings: it is possible to store the liquid oil at for instance 20° C., ensuring an oxidation rate 5 times lower than inside the fat blend or inside the filling, which must be stored at about 45° C. to avoid crystallisation of the temper hard fat. This is a big advantage compared to commercial blends bought already mixed from suppliers.

Another option to reduce the oxidation is to blend the liquid oil and the temper hard fat and then convert it into solid blocks, possibly protected by an inert gas replacing the air. This allows storage of the fat blend for several months at 4 to 20° C., for instance.

Preferably, the fat blend is stored less than 10 days above 34° C. before using in a filling, preferably less than 6 days, even more preferably less than 3 days and much preferably less than 1 day or even less than 3 hours. It is to be understood that such a time refers to the cumulative time during which the fat blend is stored above 34° C. Such a time may, for example, be divided into several stages, which may be at the same or different temperatures.

Antioxidants can also be added, such as natural additives, including tocopherols, citric acid, lecithin or ascorbyl palmitate or chemical additives such as BHA, BHT, or the like. Preferably chemical antioxidant additives are not included.

Preferably the fat blend has a trans fatty acid residue content of less than 5 wt. %, preferably less than 2 wt. %, more preferably less than 1 wt. %, based on the total weight of fatty acid residues of the fat blend. A trans fatty acid residue is a fatty acid residue containing at least one trans carbon-carbon double bond.

Preferably, the temper hard fat and the liquid oil are not inter-esterified together. By this it is meant that the temper hard fat is not inter-esterified with the liquid oil. It remains possible, however, for the liquid oil itself or for the temper hard fat itself to be inter-esterified, as explained above. Most preferably, none of the fats and oils present are interesterified.

Preferably the fat blend consists of the temper hard fat and the liquid oil. That is, the fat component of the filling does not contain any further added fat components other than the temper hard fat and the liquid oil. There may, of course, be amounts of fat included within the other ingredients, such as the cocoa powder or liquor, milk powder or nut paste. However, the added fat which forms the fat blend preferably consists of the temper hard fat and the liquid oil as described herein. In an emulsion filling where the fat blend is defined by weight of the fat phase, preferably at least 75 wt % of the fat phase is the temper hard fat and the liquid oil (with the remainder being fats from other ingredients such as cocoa liquor or full fat milk powder), more preferably at least 85 wt %, more preferably at least 95 wt % and most preferably substantially all of the fat phase.

Preferably the fat blend has a solid fat content of less than 5 wt. % at 37° C., preferably less than 2 wt. %, preferably about zero.

Preferably the fat blend has a ratio of omega-6 to omega-3 of less than 10, preferably less than 5 and preferably less than 3. Omega-6 fatty acids are a family of polyunsaturated fatty acids that have in common a carbon-carbon double bond in the n-6 position, that is, the sixth bond counting from the methyl end. Omega-6 fatty acids include, for example, linoleic acid and arachidonic acid. By contrast, omega-3 fatty acids are polyunsaturated fatty acids with a double bond at the n-3 position. Some medical research suggests that eating a lot of certain omega-6 fatty acids rather than omega-3 may lead to some diseases, and so a low ratio of omega-6 to omega-3 in the fat blend is desirable. Certain oils, such as canola oil, naturally have a low omega-6 to omega-3 ratio.

Fillings in accordance with the present disclosure are preferably suitable for storage at room temperature, i.e. typically from 10 to 30° C., preferably from 15 to 25° C. Preferably, the fillings are not used in frozen products, such as ice creams. Preferably, the fillings are not used in refrigerated products, i.e. not stored in a fridge at 0 to 10° C. (typically 4° C. with a shelf life of less than 6 weeks).

Preferably the fillings in the final product have a shelf-life of at least 6 months at 20° C., more preferably at least 9 months and even 12 months. This permits the formation of a shelf stable filling and final product. Indeed, the anhydrous fillings, when processed according to the method disclosed herein, can be kept without melting, oil separation, fat bloom nor major visual or texture changes for at least 11 weeks at 30° C. and 1 year at 25° C. (isothermal +/−1° C.).

The one or more powdered food ingredients include conventional filling ingredients. Preferably the at least one powdered food ingredient is selected from sugar, icing sugar, cocoa powder, milk powder and other milk derivatives (like whey powder), non-gelatinised starch, aromas (vanilla extracts, vanillin and the like). In case of savoury fillings, it can contain lower levels of sugars and more non-gelatinised starch and other flavouring powders like cheese, tomato or herbs.

The fillings preferably comprise one or more emulsifiers, preferably lecithin. Anhydrous fillings may additionally comprise other emulsifiers, including polyglycerol polyricinoleate and/or ammonium phosphatide. Emulsion fillings preferably further comprise added mono- and diglycerides of fatty acids and/or polyglycerol esters of fatty acids.

When the filling is an emulsion filling, it preferably contains some moisture or water, either directly added or added through ingredients like liquid glucose syrup, honey, concentrated milk and the like. It may also contain water-activity depressors such as sugars and/or polyols. Preferably an emulsion filling contains water and one or both of following polyols: glycerol and sorbitol.

Preferably, the moisture content of the emulsion filling is 10% or more, preferably 15% or more, preferably from 15 to 30%, most preferably from 15 to 25%.

The filling may be anhydrous and may contain a lactic culture. "Lactic culture" means any bacteria suitable for producing fermented food product yielding lactic acid. These bacteria are chosen amidst the genus of *Lactobacillus, Lactococcus, Streptococcus* and *Bifidobacteria*. Examples of *Lactobacillus* are *L. acidophilus, L. delbrueckii, L. kefiri, L. helveticus, L. salivarius, L. casei, L. curvatus, L. plantarum, L. sakei, L. brevis, L. buchneri, L. fermentum* and *L. reuteri*. One example of *Lactococcus* is *L. lactis*. One example of *Streptococcus* is *S. thermophilius*. Examples of *Bifidobacteria* are *B. bifidum, B. longum* and *B. infantis*.

In one preferred embodiment, if the anhydrous filling comprises yoghurt, then the lactic culture is a blend of *L. delbrueckii* and *S. thermophilus*, more preferably *L. delbrueckii*, subsp. *bulgaricus* and *S. thermophilus*.

The method preferably involves the steps of at least partially melting the fat blend and adding at least one powdered food ingredient to form a filling composition. Optionally the filling composition may then be reheated to fully melt the fat blend within the filling. Preferably, all the fat blend is melted before the later tempering step.

Tempering is a well-known process in the art for temper fats, especially in the field of chocolate. Tempering is well known to the chocolatier, since cocoa butter must be tempered to enable a good gloss, contraction, snap and to prevent "fat bloom" in the resulting chocolate product. In chocolate, tempering is used to create mostly crystal seeds in form beta (type V and/or VI): this ensures that only stable polymorph (usually form V) crystallises after depositing upon final cooling. Indeed, the type of crystals that form during cooling is usually the same (beta prime or beta), if cooling is not too quick, as the ones present during tempering.

One way to do this tempering is to first cool the molten fat until the temper fat starts to crystallise (which increases the viscosity dramatically) usually in unstable polymorphs; then reheat to convert and melt unstable crystals such that only the most stable β-form remains crystallised at depositing (the viscosity is also reduced after this reheating stage). Tempering and depositing are followed by a final cooling step, which is important to finish the crystallisation.

An alternative mean of tempering is to add a small quantity of stable beta SOS seed crystals to the fat blend already cooled at the depositing temperature (to avoid to remelt the added seeds): these seeds will drive the formation of the stable beta forms upon cooling, thus obviating the need for the more complex step of a stronger cooling under shear followed by an intermediate reheating step. Examples of stable beta SOS seeds are e.g. 1,3-behenoyl-2oleoylglycerol, or a temper hard fat already crystallised in beta form (for instance after ageing 2 weeks at 26° C.); it is important that these crystals are converted into a fine powder to provide a huge amount of seeds.

The filling composition described herein is tempered to form a tempered filling composition. It should be understood that in the context of the present disclosure, "tempering" includes and may consist of an initial step of fully melting the filling composition, if not fully melted upon its formation from the fat blend and the at least one powdered food ingredient. Full melting means heating to a temperature such that the fat blend of the filling is entirely in liquid form (as measured by SFC=0), such as heating to a temperature of from 35 to 80° C., preferably from 40 to 60° C., more preferably from 40 to 50° C. and most preferably to about 45° C.

Preferably the step of tempering the filling composition as described herein comprises an initial step of fully melting the filling composition, if not already fully melted, cooling the filling composition to a first temperature whereby the temper hard fat begins to crystallise, and then preferably reheating the filling composition to form a tempered filling composition. Preferably the first temperature is from 19 to 31° C., more preferably from 20 to 29° C., still more preferably from 20 to 27° C. and most preferably from 23 to 26° C. Unlike for chocolate, in some cases, the reheating after the first cooling can be avoided or can be less than 1° C., but this is not preferred. It is important however that the composition contains crystal seeds (is tempered) before it is applied to the bakery product. The step of tempering may preferably include high shear mixing. This is desirable to prevent the growth of large crystals and to ensure a maximum of small crystals throughout the filling.

Suitable devices for tempering the fillings are conventional chocolate temper unit or scrapped surface heat exchangers, preferably temper unit for anhydrous fillings and stainless steel scrapped surface heat exchangers for emulsion fillings.

The tempered filling composition is then deposited on to at least one surface of a bakery product to form a filled bakery product. By this it is meant that the tempered filling composition is put or set down on to at least one surface of a bakery product. In the context of the present disclosure, depositing includes injecting, extruding, spraying or any other suitable means for setting the composition onto the surface. In the present disclosure it is important that the filling has been tempered before deposition. This ensures that the filling firms well on the surface of the bakery product.

Before deposition, the filling may be aerated to reduce its density. Preferably the tempered filling composition is aerated to decrease its density to from 650 to 1300 g/L preferably to from 700 to 1200 g/L, more preferably to from 950 to 1190 g/L, prior to the step of depositing the tempered filling composition. By aeration it is meant the process by which air or another gas is dispersed in the tempered filling composition. This can be achieved by mechanical means, for example by passing air through the composition under pressure and shear. A preferred alternative is to aerate inside the tempering equipment (to avoid extra equipment), or when higher aeration levels are needed, after the tempering equipment, for instance with a Mondomix aerator: in this case, temperature control is necessary to ensure a suitable tempering level is kept.

The tempered filling composition is deposited at a deposition temperature of from 20 to 33° C. Preferably the deposition temperature is from 24 to 31° C., preferably from 26 to 29° C. The deposition temperature is preferably selected so as to obtain a high temper (H3.5), as will be explained in the Examples. The deposition temperature is preferably approximately that of the exit of the temper unit, more preferably 0.5 to 1° C. higher. The degree of tempering is preferably measured at the point of deposition, and not at the exit of the temper unit.

Without tempering and/or active cooling, the fillings according to the disclosure exhibit a slow crystallisation and fat bloom after a few days or weeks of storage, like for chocolate; but also a much softer texture (not seen to such an extent when chocolate is crystallised without tempering and/or active cooling).

Surprisingly, the tempered fillings described herein can be deposited at temperatures lower (and in some cases much lower) than possible for chocolate:
 the anhydrous fillings do not increase in viscosity as quickly as chocolate during the cooling stage, allowing the use of lower temperatures for the lowest tempering temperature and/or for the depositing temperature
 It is possible, before depositing, to not reheat above temperatures of remelting of the beta prime crystals known for cocoa butter (26-28° C.), without seeing later keeping test issues like fat bloom after 9 months of storage at 18, 20 or 25° C. (isothermal +/−0.2° C.). This would not be possible with chocolate.

These two points are particularly unexpected, especially when we use in our fat blend a temper fat of higher melting point than cocoa butter, even when using the highest melting point. When a CBI is added to cocoa butter inside a chocolate, it is on the contrary well known that depositing temperatures must be increased, as CBI have higher melting points: if the depositing temperature is not increased, the chocolate will become too viscous because it contains more crystallised fat.

It is important that the surface of the bakery product on which the filling is applied has a temperature of less than 36° C., otherwise the temper of the filling may be disrupted. Preferably the surface of the bakery product has a temperature of less than 33° C., preferably less than 30° C., more preferably from 0 to 30° C., still more preferably from 10 to 30° C., and most preferably from 18 to 28° C. These temperatures are much lower than for standard filling processes which may be applied to freshly made biscuits having a temperature of up to 43° C. This means that the bakery product must be cooled enough after the baking stage, for instance by allowing time at a suitable ambient temperature or by adding an active cooling step for the bakery product. The temperature of the surface of the bakery product is preferably the same as or lower than the deposition temperature. It can also be slightly higher than the deposition temperature (e.g. by 2-4° C.), as it could still be that the surface of the bakery product will not provide enough energy to re-melt all the crystals in the filling before entering the cooling tunnel. However, this is not preferred, as in this case, this will reduce the degree of tempering, reducing crystallization speed and crystal network strength.

When the filling is deposited onto chocolate, it is preferably deposited at a temperature such that the chocolate will not melt, preferably from 20 to 30° C., and typically 28° C. or less, such as 20 to 28° C.

The deposited filling is then actively cooled. By active cooling of the deposited filling composition is meant the forced transfer of thermal energy from the composition by means of a cooling device, to be contrasted with simply allowing the composition to stand and equilibrate with its surroundings, which would achieve a slower rate of cooling. By way of example, the deposited filling composition can be moved to a pre-cooled environment, placed on a cooled support such as by use of water cooling, and/or blown with cooled air. Including such a forced convection is preferred due to the rate of cooling which can be achieved.

That is, preferably the step of actively cooling the tempered filling composition is carried out in a convection cooling device, preferably wherein the convection cooling device comprises convection air having a temperature of from 5 to 20° C., preferably 5 to 15° C., much preferably 6 to 12° C. and even more preferably 8 to 10° C. The cooler temperatures can be used when the filling is more isolated in between two biscuits for instance. The higher temperatures can be used when there is a high convection, or when the biscuit part is already at a lower temperature, like 14° C. for instance.

In the step of actively cooling the deposited filling composition, the deposited filling composition is cooled to a temperature of at least 4° C. (preferably 4 to 15° C.) below the deposition temperature. Preferably in the step of actively cooling the deposited filling composition, the deposited filling composition is cooled to a temperature of at least 5° C., preferably at least 6° C., more preferably at least 7° C., and most preferably from 8 to 10° C. below the deposition temperature. Preferably the tempered filling composition is actively cooled to a temperature of less than 22° C., preferably from 18 to 22° C.

In order to provide a healthier snack food product, it is desirable to provide a healthier bakery product as the base component before introducing the filling. Preferably the bakery product has a fat content of less than 18 wt. %, preferably less than 16 wt. %, more preferably less than 14 wt. %, still more preferably less than 12 wt. %, and most preferably from 6 to 12 wt. %.

It has advantageously been found that the stability of the final product and, in particular, the shelf-life, can be improved by matching the oil in the bakery product to the liquid oil component of the filling; this also simplifies operations at factories and labelling. Preferably the bakery product comprises a liquid oil selected from the group consisting of canola oil, rapeseed oil, sunflower oil, soy oil, peanut oil, corn oil, cottonseed oil, olive oil, and mixtures of two or more thereof. The most preferred liquid oil is native canola oil, soy oil, or a mixture thereof.

It is preferred that the liquid oil of the bakery product and the liquid oil of the fat blend forming the filling are the same. Where the fat blend comprises two or more liquid oils, and the bakery product comprises two or more liquid oils, each of these may be the same. In the embodiment where several oils are used, preferably at least 70 wt % of the liquid oils of the fat blend are the same as the liquid oils in the bakery product. Alternatively or in addition, at least 70 wt % of the liquid oils of the bakery product may be the same as the liquid oils of the fat blend. When biscuits were used to form a sandwich biscuit which had a low sat fat content due to the low oil content, it was expected that there would be oil migration from the filling to the biscuit, due to the fact there is more oil in the filling than in the biscuit; or from the biscuit to the filling (the oil in the biscuit could be less bound than in the filling): any of such oil migration could destabilize the filling texture and could make the component (biscuit base or filling) losing the oil adopting a "dry" texture. However, the oil migration was surprisingly very limited, perhaps due to the low fat content of the biscuit (more traditional biscuits have often 18% fat and more), but also due to the similar liquid oil used in both biscuit and filling.

It is especially preferred to provide a combination of a biscuit low in saturated fat with the filling described herein having a low sat fat (thanks to low sat fat blend described herein and a low total fat content) and aeration of the filling (to use less filling biscuit for the same filling volume). This provides a baked product filled with a filling with very low safa, although with a high filling content.

One application of the fillings described herein is to fill biscuit tartlet cavities or to fill sandwich biscuits. Preferably, the biscuits have also a low safa and are made with non-palm non hydrogenated liquid vegetable oil such as sunflower or canola. As has been explained above, the biscuit is preferably made with the same liquid oil that is used in the filling since this has been found to minimise oil migration.

As mentioned above, a particularly preferred embodiment is a sandwich biscuit. This would preferably have first and second biscuit parts with a filling therebetween. A "biscuit part" may be a dry or soft bakery product as described herein. Most preferred are dry biscuits, such as cookies, crackers or wafers, or soft products such as soft cakes. The biscuit part can consist in only one, two or more biscuits. When there is only one biscuit, the filling part can be deposited wholly onto one surface thereof or partially on each surface. The filling part can also be deposited inside the biscuit. When there are two or more biscuits, the filling part may be layered between two biscuits.

The filling part is preferably made with one of the highest melting CBI (like for instance Illexao HS 90 from AAK) blended with a liquid oil having 0% SFC at 20° C. (preferably regular and native canola); all the added oil inside the biscuit part is preferably the same as the liquid oil used in the filling. Preferably, the fat blend of the filling comprises 20 to 30 wt. %, preferably 20 to 25 wt. % of the said CBI and 80 to 70 wt. %, preferably 80 to 75 wt. % of the said liquid oil.

Compared with non-tempered palm based fillings, the fillings described herein have a more solid/less spreadable texture. As is explained herein, a more plastic texture can however be obtained by aeration, especially by increasing the aeration level.

When the Ratio A is lower and/or when we use less liquid oil/more temper hard fat, the hardness increases and the melting point increases (so the heat resistance increases) and deposition temperature and/or the temperature of the surface of the bakery product may be increased without re-melting all crystals.

The biscuit part may also contain inclusions, i.e. small pieces of edible particles with a size larger than 1 mm but lower than 15 mm, preferably lower than 10 mm, preferably lower than 7 mm and even lower than 4 mm. Inclusions may be chocolate drops, nuts like hazelnut (preferably hazelnut pieces), extruded cereal, etc. The biscuit product advantageously comprises 2 wt. % to 15 wt. % inclusions, preferably 4 wt. % to 10 wt. % by weight of the product.

Chocolate drops are pieces of solid chocolate. "Chocolate" is understood as meaning either "dark chocolate", "milk chocolate" or "white chocolate". Preferably, chocolate drops are dark chocolate pieces containing at least 35 wt. % of cocoa liquor (US legislation), more preferably 35 wt. % of cocoa solids (European Union legislation), still more preferably at least 40 wt. %.

According to a further aspect there is provided a filled bakery product obtainable by the method described herein. The fat blend described and the method result in a healthy filling having a desirable form and mouth feel.

According to a further aspect there is provided an anhydrous filling composition for a bakery product, the anhydrous filling composition comprising a suspension of at least one powdered food ingredient in a continuous fat phase,
  the continuous fat phase comprising a fat blend comprising from 15 to 67 wt. % of a temper hard fat and from 85 to 33 wt. % of a liquid oil by weight of the continuous fat phase,
  wherein the temper hard fat has a solid fat content of at least 60 wt. % at 20° C.,
  wherein the liquid oil has a solid fat content of less than 15 wt. % at 20° C.,
  wherein the fat blend has a saturated fatty acid residue content of from 16 to 42 wt. % and a polyunsaturated fatty acid residue content of less than 40 wt. %, based on the total weight of fatty acid residues of the continuous fat phase, and
  wherein the total fat content of the anhydrous filling composition is from 23 to 33 wt. %.

It will be appreciated that the filling composition comprises the fat blend described herein and all aspects of the fat blend apply equally to this aspect.

Preferably, the fillings, especially the anhydrous ones, have, when processed according to the methods described herein and after ageing at 20+/0.5° C. for 14 days, a fat melting endset between 32 to 37° C., preferably 33 to 36° C. to get both a heat resistance as high as possible (for the finished product in summer) and still a nice melting (no waxiness) and a low viscosity in mouth.

The fat melting endset is measured for instance with a "Mettler DSC-1" using 10 mg of filling in an aluminium crucible of 20 µl (reference ME-51119810), with an initial cooling from 20° C. to −60° C. at −2° C./min, a stabilization of 3 minutes at −60° C. then a heating rate of 2° C./min up to +80° C./min.

The anhydrous filling has a total fat content of from 23 to 33 wt %, preferably from 24 to 30 wt. %, more preferably from 25 to 28 wt. %. This is generally the case for fillings for bakery products where a decrease in fat content is desired. However, when using the fat blend for filling chocolate shells and for other such confectionary applications, it may be desirable (for instance due to process requirements for a low viscosity) for the total fat content to be at the higher end of the fat range and, indeed, may be from 30 to 35 wt %, more preferably from 32 to 34 wt %.

All references to the total fat content or safa of filling do not include fat which may be present in inclusions present in the filling. By inclusions it is meant discrete bodies of at least 0.4 mm, such as chocolate chips, nuts pieces, biscuits/extruded cereal pieces which may be present to provide a further texture component.

According to a further aspect there is provided an emulsion-based filling composition for a bakery product, the emulsion-based filling composition comprising a fat phase and an aqueous phase,
  the fat phase comprising a fat blend comprising from 15 to 67 wt. % of a temper hard fat and from 85 to 33 wt. % of a liquid oil by weight of the fat phase, wherein the temper hard fat has a solid fat content of at least 60 wt. % at 20° C., wherein the liquid oil has a solid fat content of less than 15 wt. % at 20° C., wherein the fat blend has a saturated fatty acid residue content of from 16 to 42 wt. % and a polyunsaturated fatty acid residue content of less than 40 wt. %, based on the total weight of fatty acid residues of the fat phase, and wherein the total fat content of the emulsion-based filling is from 15 to 30 wt. %.

The emulsion-based filling composition comprises a continuous and/or a discontinuous fat phase.

It will be appreciated that the filling composition comprises the fat blend described herein and all aspects of the fat blend apply equally to this aspect.

Preferably the emulsion-based filling composition has a total fat content of from 15 to 25 wt %, preferably 17 to 23 wt. %, preferably from 19 to 21 wt. %.

According to a further aspect there is provided a filled bakery product comprising a baked product and a filling composition as described herein.

According to a further aspect there is provided a sandwich biscuit or sandwich soft cake comprising the filling composition as described herein between first and second biscuit layers.

According to a further aspect there is provided a chocolate shell containing the filling composition as described herein. Preferably, the chocolate is a milk or a white chocolate, preferably a milk chocolate.

According to a further aspect there is provided a method for preparing a filled chocolate product, the method comprising:

providing a filling composition comprising at least one powdered food ingredient and a fat blend comprising from 15 to 67 wt. % of a temper hard fat and from 85 to 33 wt. % of a liquid oil, tempering the filling composition to form a tempered filling composition, depositing the tempered filling composition on to at least one surface of a chocolate product, wherein the surface of the chocolate product has a temperature of less than 28° C., and optionally coating the filling composition with chocolate, actively cooling the deposited filling composition, wherein in the step of depositing the tempered filling composition, the tempered filling composition is deposited having a temperature of from 20 to 30° C. and in the step of actively cooling the deposited filling composition, the deposited filling composition is cooled to a temperature of at least 4° C. below the deposition temperature, wherein the temper hard fat has a solid fat content of at least 60 wt. % at 20° C., wherein the liquid oil has a solid fat content of less than 15 wt. % at 20° C., and wherein the fat blend has a saturated fatty acid residue content of from 16 to 42 wt. % and a polyunsaturated fatty acid residue content of less than 40 wt. %, based on the total weight of fatty acid residues of the fat blend.

According to a further aspect there is provided a method for preparing a filled chocolate product, the method comprising:

providing a filling composition comprising at least one powdered food ingredient and a fat blend comprising from 15 to 67 wt. % of a temper hard fat and from 85 to 33 wt. % of a liquid oil, tempering the filling composition to form a tempered filling composition, depositing the tempered filling composition into a mould or onto a surface to form a discrete body of deposited filling composition, wherein the mould or surface has a temperature of less than 36° C., actively cooling the discrete body, optionally reheating the discrete body to a temperature of less than 31° C., preferably to from 20 to 29° C., at least partially enrobing the discrete body with tempered chocolate to form a filled chocolate product, and cooling the filled chocolate product until the tempered chocolate has solidified, wherein in the step of depositing the tempered filling composition, the tempered filling composition is deposited having a deposition temperature of from 20 to 33° C. and in the step of actively cooling the deposited filling composition, the deposited filling composition is cooled to a temperature of at least 4° C. below the deposition temperature, wherein the temper hard fat has a solid fat content of at least 60 wt. % at 20° C., wherein the liquid oil has a solid fat content of less than 15 wt. % at 20° C., and wherein the fat blend has a saturated fatty acid residue content of from 16 to 42 wt. % and a polyunsaturated fatty acid residue content of less than 40 wt. %, based on the total weight of fatty acid residues of the fat blend.

The discrete body may be a slab, a bar, a drop or similar.

The reheating of the discrete body of deposited filling composition helps to prevent the chocolate contacting it from cooling too quickly and allows the chocolate to remain glossy and keep well. In contrast, if a thin coating (1-2 mm) of tempered chocolate were to be applied to the filling which is, for instance at 12° C., chocolate will set very rapidly, will be matt and will bloom quicker.

It has been found that the heat resistance of the filling described herein is good (no oiling out, no fat bloom or visible giant crystals forming in/on the filling) up to 30° C., even for long period of time (at least 11 weeks at 30° C.).

It should be noted that due to the tempering steps, the filling may be deposited at 25° C. as a liquid, but once initially crystallised, remain solid when reheated at 30° C.

According to a further aspect there is provided a filled chocolate product obtainable by the one of the methods described above.

Preferably each of the methods described herein includes a further step of packaging the filled product.

FIGURES

The present disclosure will be described in relation to the following non-limiting figures, in which:

FIG. 1 is a flow chart of the steps conducted in the present method.

In step (a) there is provided a fat blend comprising from 15 to 67 wt. % of a temper hard fat and from 85 to 33 wt. % of a liquid oil.

In step (b) the fat blend is fully melted and preferably well mixed.

In step (c) the remaining ingredients, including dry powder ingredients such as sugar and starch are added to form the filling. If necessary, the filling is reheated to fully melt the fat blend, then the filling is tempered.

In step (d) the tempered filling composition is deposited onto a surface of a biscuit where the surface has a temperature of less than 36° C.

In step (e) the deposited filling composition is actively cooled with forced convection.

In step (f) the cooled product is packaged.

EXAMPLES

The present disclosure will now be described in relation to the following non-limiting examples.

Example 1

An anhydrous filling was prepared in accordance with the present disclosure. Table 1 gives the recipes of fillings, the tempering parameters and the hardness of the fillings after cooling and 14 days of ageing at 20° C. It is noted that in column C, the liquid oil denoted with "/" is Canola oil.

(a) Recipes 8 recipes of fillings with a chocolate flavour (C to J) according to the invention are given by Table 1 and the filling recipes X or Y below:

Filling recipe X (everything kept constant except the nature of the fat to study):

| Icing sugar | 58.23% |
|---|---|
| Cocoa powder (11% fat) | 13% |
| Fat blend | 28.57% |
| | (details in table 1) |
| Soy lecithin | 0.2% |
| Total = | 100% (30.2% fat) |

Filling recipe Y:

| Icing sugar | 62.92% |
|---|---|
| Cocoa powder (11% fat) | 11.1% |
| Fat blend | 25.78% |
| | (details in table 1) |
| Soy lecithin | 0.2% |
| Total = | 100% (27.2% fat) |

Temper hard fat used:
Cocoa butter from West Africa 64% safa, 3% PUFA and the following SFC: SFC 20° C.=78%, SFC 30° C.=50%, SFC35° C.=0%
or Illexao HS 90 (tropical CBI made from fractionated shea butter, from AAK, Sweden), having 64% safa, 4% PUFA and the following SFC: SFC 20° C.=84%, SFC 30° C.=81%, SFC 35° C.=68%, SFC 40° C.=7%

Liquid oil used: regular and native rapeseed or high oleic sunflower (not fractionated). Each of these liquid oils has 7.6% safa and a SFC at 20° C. of 0. Rapeseed has 30% PUFA and high oleic sunflower has 9% PUFA.

Table 1 also gives a comparative example "Comp-1" of a filling where all the added fat is palm oil (refined bleached and deodorized). Indeed, this has a rather low safa for a filling for a dry sandwich biscuit, as typical added fats normally used are palm oil or palm oil fractions (typically 45-60% safa), or hydrogenated coconut oil (about 100% Safa) or blends of palm oil with either hydrogenated palm kernel oil or hydrogenated coconut oil (typically 66-75% safa), the safa % being based on the total weight fatty acid residues of the fat blend added to the powders to make the filling.

(b) Preparation of the Melted Filling

A filling was prepared using a Kenwood Major mixer with a K blade (3.5 kg of filling per batch).

In an oven at 55° C. were placed:
the temper hard fat to melt overnight in a stainless steel Kenwood mixer bowl
the liquid oil (initially stored at 10° C.) for about 3 hours to reach 50° C.

All of the powders were premixed together. The liquid oil and lecithin were added to the temper hard fat inside the Kenwood bowl and the fat phase was thoroughly premixed. The fat blend was at about 50-55° C. at this point. The powder premix was added into the bowl and the filling was mixed using the Kenwood mixer for 5 minutes (at the maximum possible speed without splashing out), while maintaining the temperature at 45 to 50° C. using a heat air gun if necessary.

Two batches were prepared in this manner to provide nearly 7 kg of filling available for tempering.

(c) Filling Crystallization

Tempering was carried out using an Aasted AMK10 temper unit (the tank being full), with the pump set at 10 kg/H and the scrappers set at maximum speed (i.e. maximum shear). The tank and decrystallisor before tempering were at 45° C. (except at 55° C. for comparative example 1, due to his higher melting point). Then, the fillings were passed successively through zone 1, then zone 2 and then zone 3, the 3 zones having an independent temperature regulation. There is no aeration, as no air is injected. Tempering parameters are given in Table 1, and will be further explained below.

About 30 minutes after reaching temperature equilibrium, depositing was carried out at the temperature of the tempering zone 3, directly out of the exit pipe, on biscuits to make the sandwiches (see below) or in Rodac plates for analysis. Rodac plates are standardized petri dishes commonly used in microbiology (cylinder of diameter 57 mm and 4.6 mm deep).

The deposited fillings were cooled in a Sollich cooling tunnel (designed for chocolate) with air convection at 10° C. Some of the Rodac plate samples were cooled for 3.5 minutes, others for 10.5 minutes. The Rodac plates were then stored at 20° C.+/−1° C.

(d) Characterisation Method for the Tempering Degree

Surprisingly, crystallization speed and final hardness were found to be dependent on tempering degree, especially for the fillings having the lowest safa (25% or less). A large number of nuclei is preferable in order to obtain a quick crystallization and a harder fat. For chocolate, tempering degree is always measured by the temper index given by a classical chocolate tempermeter (such as Sollich E2). Surprisingly, this technique does not work for the fillings according to the invention which are always seen as not tempered whatever the tempering process parameters used. This is particular problematic. The present inventors have developed an alternative simple method (called H3.5, shorthand for "Hardness at 3.5 min") to estimate the tempering of the fillings herein by the hardness of the filling, measured by a penetrometer technique, after 3.5 minutes of cooling. This method involves:

filling Rodac plates (stored at room temperature, i.e. 25 to 26° C.) with tempered filling at the exit of the temperunit, and scrapping-off the excess of filling to make a flat surface. The scrapper is clean and is at room temperature.

immediately cooling the Rodac plates (without cover) in a Sollich cooling tunnel for chocolate with air convection at 10° C. for 3.5 minutes and measuring the hardness immediately with the procedure below.

The hardness of the filling crystallized in Rodac plates is measured with a TAXT2-plus texture analyser with the following procedure "P":
- put a Rodac plate on a suitable support to avoid the bottom of the plate to move (vertically or horizontally)
- a right cylinder probe of 10 mm diameter is moved down at a speed of 1 mm/s and the resulting force is recorded over time
- hardness is taken as the force after the probe penetrates the filling by 2 mm
- the final result, expressed in grams at 2 mm, is the mean of 3 measures.
- It is critical to make the measurements quickly (as the texture is evolving) and to take all precautions to minimize filling's temperature changes (using isolation from hands and from the TAXT-2 support plate which is hot).

The higher the H3.5, the higher the degree of tempering (i.e. the higher the degree of nucleation and growth during the tempering process). When H3.5 hardness is very low, typically <100 (e.g. 40 for example G' in Table 1), the filling is not tempered. Preferably the filling has a H3.5>100, much preferably >200, preferably >500 and even more preferably >800 g.

(e) Analysis of Final Filling Hardness

To evaluate the final texture for the consumer, we evaluated the final hardness of the fillings with the following procedure:
- filling Rodac plates as before, but cooling them for 10.5 min instead of 3.5 min inside the cooling tunnel.
- storing them (with cover added) at 20+/−0.2° C. for 14 days
- measuring by penetrometry at 20° C. with the same procedure "P" as explained before, except that we report the mean of 6 measures (maximum 2 or 3 values per Rodac plate to avoid artefacts due to interactions with wall sides and previous measurement holes): this measurement is termed "H14day20° C."
- measuring the hardness of the filling at 25° C., after placing the Rodac plates (previously stored at 20° C.) at 25° C. to equilibrate for 12-24 hours before measurement. This measurement is termed "H14day25° C.", i.e. measured at 25° C. after 14 days of storage at 20° C.

(f) Conclusions

The following conclusions may be drawn in relation to the influence of the recipe.

The typical target for the hardness of a filling for a sandwich biscuit is 3000 to 8000 g at 20° C. and minimum 1500 to 2000 g at 25° C. Although not preferred, it is possible to make sandwiches with 1000 g at 20° C. and 500 at 25° C.

Comp-1 filling has similar hardness at 20° C. to filling F, although it has 67% more Safa (49.4% vs 29.5%). In addition, it is 2 to 3 times softer at 25° C., demonstrating a lower heat resistance at 25° C.

It can clearly be seen that for the fillings of the invention, the hardness at 20 and 25° C. is strongly correlated with the ratio of temper hard fat to liquid oil, and so with the Safa level of the fat blend or of the filling.

However, the hardness also depends on the nature of the temper hard fat, especially its Ratio A: Illexao HS90 enables lower Safa for the same hardness, and also higher heat resistance/melting range compared with CB:

a fat blend with 36% Illexao CBI (filling F, 29.5% Safa) gives about the same hardness at 20° C. as 47% CB (filling D, 35.3% Safa, having about 20% more Safa). However, the hardness at 25° C. is even much lower for filling D despite its higher safa, demonstrating a higher heat resistance for hotter climate conditions with Illexao H590.

Fillings E and F have the same Safa and the same ratio of hard temper fat/liquid oil. However, filling F, having a lower Ratio A, gives much higher hardness at 20° C. and especially even much higher at 25° C. (demonstrating a higher melting range). The higher melting range can also be seen by the observed DSC melting peak and endset (not shown here to simplify).

This data demonstrates that Illexao HS90 is more effective than CB because less temper hard fat is needed for a given hardness, enabling Safa reduction and cost saving while increasing the heat resistance. However, fillings using CB as temper hard fat are still good alternatives, as filling D with a high temper is a bit harder than Comp-1 at 20° C. and much harder at 25° C., although comp-1 filling has 40% more safa. Indeed, cocoa butter may be desirable since it is more readily available than shea butter.

There is no significant difference in saturated fat and final hardness if high oleic sunflower oil is used instead of canola as the liquid oil for a given recipe. This can be seen by comparing fillings G and H.

The following conclusions can be drawn in relation to the influence of the tempering process parameters:

It was found that a lower depositing temperature gives higher H3.5 values, and that this is usually correlated with higher final filling hardness H14day20° C. However there are some exceptions, especially when the Safa becomes low (equal to or below 25 to 30%) and the depositing temperature is also low (very high temper): for fillings G''' and H''', H14day20° C. can become lower when low depositing temperature are used. This indicates that the filling is "plasticised" (as indicated in the Table 1) and the texture is irreversibly damaged, because there was too much crystallization under shear and not enough without shear.

Plasticisation has not previously been reported with temper fats, but the present inventors have found that when the filling has a Safa of at most 30%, and especially at most 25%, it becomes very sensitive to plasticisation. This means a higher degree of tempering gives both a higher crystallization speed (H3.5) and a higher final hardness, if and only if, there is still enough fat to crystallize without shear (otherwise, the fat is plasticised and final hardness H14day20° C. and/or H14day25° C. is decreased).

By comparison, for chocolate (having cocoa butter as a classical temper fat but no added oil), a higher temper index gives a higher crystallization speed but has no impact on final texture, because even if overtempered, chocolate has a very small portion of its temper fat which is crystalized under shear. Also as known by the chocolatier, an overtempered chocolate is not optimum, as having too many crystals increases the fat bloom risk compared with a well-tempered chocolate. This is not the case for the fillings disclosed herein.

Tempering parameters should be selected to enable maximum H14day20° C. (final hardness) and H3.5 (related to "crystallization speed"). If the filling hardness is too high, it is better not to lower it by plasticizing the fat: it is better to use less temper hard fat and more liquid oil, as this will reduce safa and cost.

It is possible to aerate the filling during or after tempering (preferably during): bubbles are better stabilized when the fat has a high tempering degree (more crystals), i.e. a high H3.5.

Example 2

In this Example, dry sandwich biscuits were prepared in accordance with the invention.

Biscuits were prepared based on classical sandwich biscuits. The dough ingredients are wheat flour, wholegrain wheat flour, sucrose, rapeseed oil, whole and skimmed milk powder, glucose syrup, salt, flavouring agents, soy lecithin, baking powder and a suitable amount of water for workability of the sheeting process.

The round biscuits were made by lamination (sheeting) of the dough, cut, glazing (with whole milk powder and water) and baking in a continuous oven. After baking, they contained 50% starch, 23% sugars, 11% total fat, 8% proteins, 4.6% fibers, 2.1% moisture and 1.8% ash (values w/w, rounded to the nearest whole number above 5%). They had a diameter of 66 mm and a thickness of 5.1 to 5.2 mm.

After baking, the biscuits were cooled to 28 to 30° C., and room temperature at the depositing stage was 26° C.

Previous tempered fillings were produced as indicated above except for two points:
  tempering parameters were chosen to maximize final hardness while having H3.5 of at least 800
  in addition, the filling was aerated inside the AMK10. For this, a restricting valve was placed at the exit of the temperunit and was adjusted to set the relative pressure between the pump and the temperunit heat exchangers to 1-2 bar; air was injected between the pump and the heat exchanger of the temperunit in a quantity enabling a final density of 1050 g/l (compared to 1300 g/l before aeration).

From the temperer exit, a spot of 7 g of filling was deposited at the center of a first biscuit base and then a second biscuit was placed on top and pressed immediately to make a sandwich biscuit with a filling thickness of 2.5 to 3.2 mm. The face of the base biscuits touching the filling were those without glazing. The final product contained 35% filling and 65% biscuit.

The sandwich biscuits were cooled immediately as described for the Rodac plates in Example 1, and were then stabilized at 20° C. for 3 days.

Tasting and Keeping Tests

After the three days of stabilization, the Rodac and sandwich biscuits were stored in parallel at 4 temperature conditions:
  Isothermally at 16, 20 and 25° C.
  At ambient temperature (between about 15 to 27° C.).

Products were tasted at 14 days: all fillings were firm to very firm (this correlates well with the hardness measured at 20° C. after 14 days) and were strongly stuck to the biscuit bases.

When eaten separately by carefully opening the sandwich, the fillings all had a clean melting without waxiness except the comp-1 which was less melting and had some waxiness due to incomplete melting in the mouth. Flavour release for the fillings C to I was really very pleasant, like in chocolate, and much better than the comp-1 filling; the more melting/higher flavour release were found to be for the lowest safa (I, then H and G).

Filling J was the best compromise for making sandwich biscuits. It was less hard than Comp-1 at 20° C. (H14day20° C.), but has a similar hardness at 25° C. (H14day25° C.) and it is still acceptably hard for making sandwich biscuits. The softer texture compared to filling F is the consequence of less hard temper fat and more canola oil used, which provides two benefits: a significant safa reduction (Comp-1 had 2.15 times more safa than filling J, i.e. +115%: 49.4 vs 23%) and a cost saving (canola being much cheaper than Illexao HS90). In addition, although filling J had 10% less fat and 15% less cocoa powder than the others, it was still pleasant and had a viscosity in mouth and a flavor release similar to Comp-1.

In Table 1, and when no other indication is given, safa levels are indicated based on the total weight of fatty acid residues of the fat (either in the fat blend, in the total fat of the filling or in the fat phase for an emulsion). Because fillings do not only contain fat but also a lot of sugar and other powders, safa expressed per 100 g of filling are much lower. For instance, filling J had 21.3% safa based on the total weight of fatty acid residues of the fat blend added, and 23% safa based on the total weight of fatty acid residues of the total fat (with the fatty acid residues coming not only from the added fat blend but also cocoa powder and lecithin) but only 6.3% safa based on the total weight of filling (23% safa based on total fat×27.2% total fat).

Filling Comp-1 had 49.4% safa based on the total weight of fatty acid residues of the total fat, and 14.9% safa based on the total weight of filling (49.4% safa based on total fat×30.2% total fat).

The Comp-1 filling therefore had 2.37 times more safa than filling J when expressed on the total weight of filling (14.9% vs 6.3%), although the difference was only 2.15 times when expressed on the total weight of fatty acid residues of the total fat.

Fillings C to J were tasted again after 9 months in the said storage conditions: neither Rodac (not aerated) nor sandwich biscuits (aerated and with biscuit-filling interaction) showed bad evolution (no presence of oiling off, visible oil migration, fat bloom or recrystallization in giant crystals).

Chemical analysis (in duplicate) of the total fat content in sandwich biscuits made with filling H and stored for six months under either 18° C. and 25° C. (+/−0.2° C.) have demonstrated there is no significant total fat change neither in the filling nor in the base biscuit (comparing with analysis of fresh sandwich biscuits or with theoretical recipes). There is also no significant total fat change for sandwiches made with filling G stored at ambient temperature for 11 months. This demonstrates that there is no fat migration, even with very low safa in the filling (24.4% based on the total weight of fatty acid residues of the total fat) and very high liquid oil in the fat blend (73%), and this was found to be the case whether the liquid oil in the filling was high oleic sunflower oil or rapeseed oil (the biscuit being made with rapeseed oil).

Example 3

An emulsion filling was prepared in accordance with the present invention.

The recipe of an emulsion filling with a flavor of milk chocolate is given below:

| Mixing step | Ingredient | % |
| --- | --- | --- |
| 1.1 | Regular Rapeseed oil (liquid oil) | 15.80 |
| 1.1 | Illexao HS90 (temper hard fat) | 8.90 |
| 1.2 | Icing sugar | 19.21 |
| 1.2 | Dextrose monohydrate | 19.43 |
| 1.2 | Cocoa powder 11% fat | 7.61 |

-continued

| Mixing step | Ingredient | % |
|---|---|---|
| 1.2 | Skimmed Milk Powder | 7.61 |
| 2. | Emulsifier (aqueous gel of E471 + E475, 37% water) | 1.50 |
| 2. | Glycerol | 2.50 |
| 2. | Potassium sorbate powder | 0.20 |
| 2. | Water | 17.24 |
| | Total | 100.0 |
| | Total moisture content % = | 20.0 |
| | Total fat content % = | 26.1 |

The fat phase comprises the added fat blend, which comprise 36% of temper hard fat and 64% of liquid oil. The nature of the two fats making the fat blend is about the same than in Example 1-recipe F. The fat blend here has 27.9% safa (based on the total weight of fatty acid residues of the fat blend).

The filling has 30.2% safa based on the total weight of fatty acid residues of the total fat and 7.9% (30.2×26.1%) safa based on the total weight of filling.

Ingredient Mixing Procedure:

Step 1.1: The rapeseed oil and temper hard fat are placed at 51° C. to preheat and melt, then are premixed to make a fat blend (containing 36% of temper hard fat) and adjusted to 50° C.

Step 1.2:

a) The powdered ingredients of this step are premixed together b) And are then added and dispersed well within the fat blend of step 1.1.

Step 2: A premix is made with all the ingredients of step 2 (at 40 to 45° C.).

Step 3: The premix of step 2 is added inside the premix of step 1.2 and adjusted to 45 to 50° C.

Steps 1.1, step 1.2 b) and step 3 are carried out inside a planetary mixer with a double jacket at 50° C. to control temperature. Step 2 is carried out by hand in a big bucket.

The fillings have 20% moisture, a density of 1140 g/l and an Aw of 0.72+/−0.03.

Filling Tempering and Aeration:

The emulsion filling prepared in step 3, being at 50° C., is pumped (10 kg/H) successively to a Chemtech scrapped surface heat exchanger (SSHE) and to a Mini Mondomix Aerator to be successively tempered and aerated. All metallic equipment pieces (including pumps, pipes and valves) are stainless steel.

The infeed tank, the pump and pipe before the SSHE are double jacket and heated with water at 50° C.

The SSHE has a double jacket supplied with 20° C. water: the filling exit is at 23° C. It immediately entered the Aerator (with a double jacket supplied with 15° C. water).

The pipe between SSHE and Aerator is short and jacketed with water at 23.5° C.

Air is supplied at the Mondomix entrance at a flow rate enabling a density of 730 g/l, and a backpressure enables a relative pressure of 3.5 bar to be maintained inside the Mondomix. The filling exit the aerator at 24° C. being tempered and aerated (730 g/l) in a very stable foam.

The emulsion is bi-continuous: some parts are water continuous, others are fat continuous.

Some filling in deposited/forced into a Rodac plate just after the exit of the Mondomix, and sent to a Sollich cooling tunnel for chocolate with air convection at 10° C. for 11 minutes: hardness measured with procedure "P" out of the cooling tunnel (filling temperature being 15° C.) is about 110 g.

After 1 day of storage at 20° C., the hardness (still measured with the same procedure) is 170 g.

This value is much lower than for the anhydrous fillings (due mainly to the emulsion and also to the high aeration), but the filling mousse is however very useful to make a soft sandwich filling due to the high filling stickiness.

Base Soft Cake:

To make the sandwiches, commercial soft "sponge" cakes sheets are used. These are sold in France for instance by "Club Restauration" under the brand "Jean Ducourtieux". It is sponge cake sold in large sheets of 8 mm thick. They are classically used by pâtissiers to make "fraisiers" or "bûaches" or swiss roll cakes for instance.

The composition of these sheets is: wheat flour, eggs, sucrose, glucose-fructose syrup, stabilisers (glycerol, sorbitol), flavoring agents, rapeseed oil, skimmed milk powder, emulsifiers: soy lecithin, E471, E475, salt, baking powders (E450i, E500ii).

Nutritional/analytical values for 100 g: 7.8% protein, 58.3% carbohydrates (of which 31.8% sugars and 23.5% starch), 8.8% lipids, 6.4% polyols, 1% fibre and 17% water. Aw=0.71.

Round pieces of diameter about 64 mm were cut in the sponge cake, weighing 6.2 g each. A soft cake sandwich was made using two such cake pieces and about 6.7 g of emulsion filling of Example 3 (35% of filling in the sandwich soft cake).

The soft cakes round pieces were at room temperature (25° C.), and the filling out of the aerator was deposited manually in a spot at the centre of a first cake disk, then a second cake was placed on it. This was pressed between two parallel planes to spread the filling until it reached about 3 mm from the edges/sides.

The sandwich soft cakes were then sent immediately to a Sollich cooling tunnel for chocolate with air convection at 10° C. for 11 minutes, before being individually packed in flow pack made with classical aluminium-plastic complex having very good moisture and UV barrier properties.

The sandwich soft cakes had a nice soft texture, both in the cake and in the filling. The filling stuck the two cakes together, and had a very nice melting and flavour release. Sandwiches remained stable for 6 months at 20° C.

Example 4

It is known that any oil migrating into chocolate is likely to induce fat bloom on the chocolate surface. This is due to the recrystallization of cocoa butter in big crystals which are visible with the naked eye.

In Example 4 a filling according to the invention, containing a lot of liquid oil, is covered with milk chocolate to study its compatibility.

Method:

Proportion of components: 75% filling/25% chocolate

Thickness of chocolate: 0.9 mm (corresponding to the minimum mean thickness of any chocolate application).

Filling composition: see recipe K in Table 2

Chocolate: milk chocolate of the Milka™ brand (Mondelēz International), having 29.5% total fat (including 4.8% anhydrous milk fat, and not containing cocoa butter equivalent). To improve the spreading of this very thin chocolate layer, 1% cocoa butter and 0.5% PGPR was added (mixed at 45° C.).

This model test is very strict because any fat migration from the filling to the chocolate surface will be quick due to:
very low chocolate thickness
high filling/chocolate ratio (75/25)
no filling aeration
liquid chocolate enrobing the filling before crystallization (liquid chocolate is not resistant to oil migration)
The test therefore represents a worse case test.
Process:
The filling is prepared, tempered and cooled as in Example 1, with tempering parameters as in Table 2 (column K). 2 types of Rodac plates were prepared:
Some plates (a) are prepared as in Example 1 (filled to the top and scraped), then stored 14 days at 20° C. They were later used to measure hardness (by penetrometry) and melting (by a Mettler DSC-1), as indicated previously. Results are in Table 2.
Other Rodac plates (b) are not filed to the top, but only with 9 g (exactly) of filling per plate
Rodac plates then receive (immediately after depositing) adequate shaking to flatten the filling surface
Filling in Rodac plates is then crystallised in the cooling tunnel as in Example 1.
These plates are later used for contacting with chocolate.
Chocolate dosing:
Filling in Rodac plates (b) is first stabilized 3 days at 18° C., then reheated at 26 to 27° C. for 2H just before to dose the chocolate (in particular to help the chocolate spreading).
The milk chocolate is tempered with an Aasted AMK10 used at 10 kg/H, with a chocolate exit temperature of 26° C. Using a Sollich E2 tempermeter, the chocolate temper index is 5.8 and the crystallization temperature 23.2° C.
3 g (exactly) of the milk chocolate is deposited on the surface of the filling inside the Rodac plate, using a syringe.
To get a uniform flat chocolate layer of 0.9 mm thickness, three specific techniques are used: depositing with the syringe covers initially most of the surface, then a microbiology plastic spreader is used immediately to improve the spread, followed by adequate shaking.
Both said syringe and microbiology spreader are clean and initially stored at the same temperature as the chocolate exit temperature.
The chocolate is then crystallised in a Sollich cooling tunnel with air convection at 12° C. and low air speed during 10 minutes (common best practice for a thin milk chocolate layer).
Keeping Tests with Filling and Chocolate:
Rodac plates (b), containing the chocolate on top of the filling, are stabilized 3 days at 18° C.
Then, they are stored in 3 conditions, indicated below:
Inspection for fat bloom on the chocolate was done visually (by naked eye), each week during 42 weeks:

| Storage conditions: | Fat bloom result: |
|---|---|
| a) Isothermal 25° C. | No bloom after 42 weeks (end of the test) |
| b) Isothermal 18° C. | Slight bloom appeared after 29 weeks (but still only very slightly visible after 42 weeks, i.e. probably not seen by consumers) |

-continued

| Storage conditions: | Fat bloom result: |
|---|---|
| c) Room temperature (20 to 27° C.) | Slight bloom appeared after 32 weeks (but still only very slightly visible after 42 weeks, i.e. probably not seen by consumers) |

Here isothermal means +/−0.5° C.
From our experience, no bloom after 12 weeks at 25° C. is desirable.
These results shows there is no bloom under any of conditions tested (between 18 and 27° C.) over a period of about 7 months (29 weeks), and that any bloom observed after was only very slightly visible for experts—this suggests that it will not be an issue for consumers. As indicated earlier, this is a worse case test: for thicker chocolate, aerated filling and/or lower filling/chocolate ratio, the compatibility will be higher, i.e. the resistance to bloom will be extended.
Note that typical fat blends compatible with chocolate in term of fat bloom generally have more than 55% safa, whereas the filling K according to the invention has only 24.5% safa in the fat blend, i.e. a safa reduction of 55% (based on the total weight of fatty acid residues of the fat blend).

Example 5

Harder recipes L, M, N and O were made and analysed with the same methods as in Example 1: recipes L to O have higher safa % than recipes F to J, and can be used to replace harder fillings or to get a higher heat resistance.
Melting points have also been characterised by DSC as explained in Example 4, for these new recipes and also for recipe J (trials already given in Table 1, but without DSC results). For recipes C to I, a different DSC equipment and method was used: the results cannot be compared directly and therefore are not reported.
Recipes, tempering parameters and analytical results are given in Table 2. It can be seen that hardness at 20 and 25° C. and melting temperature (and thus the heat resistance) all increase with the proportion of the temper hard fat (Illexao HS90).
However, all recipes J to O are very pleasant during tasting—they fully melted in mouth, as confirmed by DSC. Their melting peaks are from 31.6 to 34.7° C. and their endset of melting is from 33.8 to 36.7° C.
Examples 1 and 5 demonstrate how versatile the invention is, since by changing the proportion of the same temper hard fat (Illexao HS90) and liquid oil (canola or sunflower oil), fillings can be made having a hardness at 20° C. of about 1300 g for filling I (having 17.2% safa based on the total weight of fatty acid residues of the fat blend) to about 13200 g (10 times more) for filling O (having 38.6% safa). At 25° C., the hardness range is from about 600 g for filling I to about 9500 g (about 16 times more) for filling O.

Example 6

Table 3 presents control trials to demonstrate the effect of tempering and active cooling for fillings according to the invention. Filling recipes K and J are the same as in the previous examples. They are filled and scrapped in Rodac plates (as explained in Example 1), but with various crystallization conditions:

with or without tempering (in that case, the filling is deposited at 45° C.)

Cooling:
active in a cooling tunnel with forced air convection
passive at 18° C. and at 25° C. in a room (without forced air convection).

Fillings in Rodac plates are then stored during 2 weeks (conditions indicated in Table 3). Then:
a visual inspection is done to evaluate the crystallization
3 Rodac plates are put for 1 day at 20° C. to measure hardness at 20° C. and DSC, as indicated in previous examples
2 other Rodac plates are put for 1 day at 25° C. to measure hardness at 25° C.

The analysis on Rodacs is reported in Table 3 as shown in the lines labelled "Final product".

As can be seen:
Non-tempered fillings are much softer at 20 and 25° C. than tempered fillings. They are also very grainy when no active cooling is applied, but also slightly grainy even with an active cooling (grainy is in appearance and texture). Their melting and flavor release is also much less pleasant, as their endset is from 38.4 to 40.3° C.: this is 4.6° C. higher than for the tempered fillings (in average for the 3 cooling conditions) and this is also now above mouth temperature.

When filling is tempered properly (Recipe J), an active cooling is still preferred, especially to have a better appearance.

When no tempering is applied, an active cooling gives higher hardness than passive cooling, but they are still much lower than with tempering. This demonstrates that tempering and an active cooling allow the provision of fillings according to the invention which are harder, with nice appearance (shiny, no bloom, homogeneous) and with a nice texture and a full melting in mouth. Full melting also means full flavor release and the lowest viscosity as possible in mouth.

Unless otherwise stated, all percentages herein are by weight.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

TABLE 1 example 1

| | Recipe code | Comp 1 | C | D | E | F | G |
|---|---|---|---|---|---|---|---|
| Fat blend and filling composition | Code Filling recipe | X | X | X | X | X | X |
| | % fat in filling | 30.2 | 30.2 | 30.2 | 30.2 | 30.2 | 30.2 |
| | Nature of the liquid oil | none | / | Canola | Canola | Canola | Canola |
| | % liquid oil (canola or ho sunflower) | 0 | 41 | 53 | 63.7 | 63.9 | 73.4 |
| | % Cocoa Butter | 0 | 59 | 47 | 11.4 | 0 | 0 |
| | % Illexao HS90 | 0 | 0 | 0 | 24.9 | 36.1 | 26.6 |
| | % Other Fat | 100 RBD Palm | 0 | 0 | 0 | 0 | 0 |
| | Ratio A of the temper hard fat | 90 | 41 | 41 | 17 | 7 | 7 |
| | % Safa (in total fatty acids of added fat blend) | 49 | 40.9 | 34.1 | 28.1 | 28 | 22.6 |
| | % Safa (in total fatty acids of total fat in filling) | 49.4 | 41.7 | 35.3 | 29.6 | 29.5 | 24.4 |

| | Tempering code | Comp- | C' | C" | D' | D" | E' | F' | F" | G' | G" |
|---|---|---|---|---|---|---|---|---|---|---|---|
| Tempering | Comment on tempering type | | Low temper | high temper | Low temper | high temper | temper | Low temper | high temper | Too Low temper | high temper |
| | Filling temperature (° C.) ex zone 1 | 37.1 | 30.4 | 29 | 29 | 26.6 | 24 | 32 | 32 | 31.8 | 31 |
| | Filling temperature (° C.) ex zone 2 | 32.2 | 22.8 | 23 | 22 | 21.7 | 22.8 | 23 | 26 | 23.7 | 23 |
| | Water Jacket temperature (° C.) in zone 2 | NA | 12 | 12 | 12 | 12 | 12 | 12 | 18 | 15 | 15 |
| | Filling temperature (° C.) ex zone 3 | 31.2 | 28.5 | 27 | 27.1 | 25.6 | 28.8 | 30.2 | 23.5 | 30.6 | 27.7 |
| | H3.5 (Hardness in g @ 2 mm, after 3'30" at 10° C.) | 1162 | 1068 | 2958 | 702 | 1105 | 1300 | 1822 | 4113 | 40 | 1266 |
| Final product | Hardness (g @ 2 mm) day 14 20° C. = H14 day20° C. | 7150 | 14019 | 16442 | 6931 | 8291 | 4374 | 8274 | 7056 | 2874 | 3847 |
| | Hardness (g @ 2 mm) day 14 25° C. = H14 day25° C. | 1746 | 6749 | 9456 | 3397 | 3257 | 1718 | 5613 | 4180 | 1440 | 2253 |
| | Ratio hardness 25° C./ hardness 20° C. (% rounded) | 24 | 48 | 58 | 49 | 39 | 39 | 68 | 59 | 50 | 59 |

| | Recipe code | G | H | I | J |
|---|---|---|---|---|---|
| Fat blend and filling composition | Code Filling recipe | X | X | X | Y |
| | % fat in filling | 30.2 | 30.2 | 30.2 | 27.2 |
| | Nature of the liquid oil | Canola | high oleic sunflower | high oleic sunflower | Canola |
| | % liquid oil (canola or ho sunflower) | 73.4 | 73.4 | 83 | 75.75 |

TABLE 1-continued example 1

|  |  |  |  |  |  |  |  |  |  |  |
|---|---|---|---|---|---|---|---|---|---|---|
| % Cocoa Butter | 0 | | 0 | | | 0 | | 0 | | |
| % Illexao HS90 | 26.6 | | 26.6 | | | 17 | | 24.25 | | |
| % Other Fat | 0 | | 0 | | | 0 | | 0 | | |
| Ratio A of the temper hard fat | 7 | | 7 | | | 7 | | 7 | | |
| % Safa (in total fatty acids of added fat blend) | 22.6 | | 22.6 | | | 17.2 | | 21.3 | | |
| % Safa (in total fatty acids of total fat in filling) | 24.4 | | 24.4 | | | 19.3 | | 23.0 | | |

|  |  | G''' | H' | H'' | H''' | I' | I'' | I''' | J' | J'' | J''' |
|---|---|---|---|---|---|---|---|---|---|---|---|
| | Tempering code | | | | | | | | | | |
| Tempering | Comment on tempering type | PL* | Low temper | high temper | PL* | Low temper | | high temper | ok | ok | low temper |
| | Filling temperature (° C.) ex zone 1 | 29 | 33 | 28.2 | 28 | 28.5 | 29 | 28 | 25.8 | 25.7 | 26.2 |
| | Filling temperature (° C.) ex zone 2 | 21 | 24.8 | 23.7 | 21.4 | 21 | 22 | 20 | 23.8 | 24.1 | 24.4 |
| | Water Jacket temperature (° C.) in zone 2 | 10 | 15 | 18 | 15 | 15 | 15 | 15 | 18 | 18 | 18 |
| | Filling temperature (° C.) ex zone 3 | 21.6 | 28.8 | 26.3 | 21.2 | 26.3 | 23 | 21 | 26.5 | 28.3 | 29.5 |
| | H3.5 (Hardness in g @ 2 mm, after 3'30" at 10° C.) | NA | 1370 | 1651 | NA | 904 | 875 | 1069 | 1040 | 900 | 980 |
| Final product | Hardness (g @ 2 mm) day 14 20° C. = H14 day20° C. | 1550 | 3033 | 5815 | 1223 | 1396 | 1256 | 1337 | 3048 | 3340 | 2978 |
| | Hardness (g @ 2 mm) day 14 25° C. = H14 day25° C. | 985 | 1413 | 3916 | 783 | 597 | 585 | 642 | 1798 | 1775 | 1410 |
| | Ratio hardness 25° C./ hardness 20° C. (% rounded) | 64 | 47 | 67 | 64 | 43 | 47 | 48 | 59 | 53 | 47 |

*PL = Plasticised

TABLE 2

(Examples 4 and 5)

|  | Recipe code | J (recall from table 1, with new DSC results) | K | L | M | N | O |
|---|---|---|---|---|---|---|---|
| Fat blend and filling composition | Code Filling recipe | Y | X | X | X | X | X |
| | % fat in filling | 27.2 | 30.2 | 30.2 | 30.2 | 30.2 | 30.2 |
| | Nature of the liquid oil | Canola | Canola | Canola | Canola | Canola | Canola |
| | % liquid oil (canola or ho sunflower) in the fat blend | 75.75 | 70 | 60 | 54 | 50 | 45 |
| | % Illexao HS90 in the fat blend | 24.25 | 30 | 40 | 46 | 50 | 55 |
| | Ratio A of the temper hard fat | 7 | 7 | 7 | 7 | 7 | 7 |
| | % Safa (in total fatty acids of added fat blend) | 21.3 | 24.5 | 30.2 | 33.5 | 35.8 | 38.6 |
| | % Safa (in total fatty acids of total fat in filling) | 23.0 | 26.2 | 31.6 | 34.8 | 36.9 | 39.6 |
| | Tempering code | J' J'' J''' | / | / | / | / | / |
| Tempering | Comment on tempering type | ok  ok  Low temper | ok | ok | ok | ok | ok |
| | Filling temperature (° C.) ex zone 1 | 25.8  25.7  26.2 | 28.7 | 27.5 | 25.6 | 26.2 | 26.2 |
| | Filling temperature (° C.) ex zone 2 | 23.8  24.1  24.4 | 24 | 23.6 | 22.8 | 23 | 23 |
| | Water Jacket temperature (° C.) in zone 2 | 18  18  18 | 18 | 18 | 18 | 18 | 18 |
| | Filling temperature (° C.) ex zone 3 | 26.5  28.3  29.5 | 25.8 | 27.1 | 27.1 | 27.2 | 27.2 |
| | H3.5 (Hardness in g @ 2 mm, after 3'30" at 10° C.) 1040  900  980 | | 2500 | 5910 | 6928 | 7900 | 10174 |
| Final product | Hardness (g @ 2 mm) day 14 20° C. = H14 day 20° C. | 3048  3340  2978 | 3833 | 7414 | 9849 | 10681 | 13188 |
| | Hardness (g @ 2 mm) day 14 25° C. = H14 day 25° C. | 1798  1775  1410 | 1673 | 4097 | 6850 | 7271 | 9517 |
| | Ratio hardness 25° C./hardness 20° C. (% rounded) | 59  53  47 | 44 | 55 | 70 | 68 | 72 |
| | Melting Peak temperature ° C. (by DSC at 2° C./min) | 31.7  31.6  31.9 | 32.0 | 33.2 | 33.9 | 34.1 | 34.7 |
| | Endset melting temperature ° C. (by DSC at 2° C./min) | 33.9  34.1  33.8 | 34.2 | 35.4 | 35.9 | 36.2 | 36.7 |

TABLE 3

| Recipe code | | J | | | | | | K | | |
|---|---|---|---|---|---|---|---|---|---|---|
| Tempering & cooling | Tempering | Tempered (as in Table 3, J') | | | Not tempered | | | Tempered as in Table 3 | Not tempered | |
| | Cooling Temperature (° C.) | 12 | 18 | 25 | 12 | 18 | 25 | 12 | 18 | 25 |
| | Active (convection cooling tunnel) or Passive (cooling in a room) | Active | Passive | Passive | Active | Passive | Passive | Active | Passive | Passive |
| Storage | Storage temperature (° C.) | 18 | 18 | 25 | 18 | 18 | 25 | 18 | 18 | 25 |
| | Storage time (days) | 14 | 14 | 14 | 14 | 14 | 14 | 14 | 14 | 14 |
| Fianl product | Hardness (g @ 2 mm) day 14 20° C. = H14 day20° C. | 3048 | 3000 | 2733 | 1814 | 703 | 567 | 3833 | 1170 | 782 |
| | Hardness (g @ 2 mm) day 14 25° C. = H14 day25° C. | 1798 | 1715 | 1408 | 739 | 356 | 261 | 1673 | 912 | 452 |
| | Melting Peak temperature ° C. (by DSC at 2° C./min) | 31.7 | 32.2 | 33.4 | 34.6 | 34.4 | 38.2 | | | |
| | Endset melting temperature ° C. (by DSC at 2° C./min) | 33.9 | 34.3 | 35.1 | 38.4 | 38.4 | 40.3 | | | |
| | Visual appearance of the filling SURFACE after 14 day of said storage. | Perfect (homogeneous, shiny, no bloom) | Acceptable: homogeneous, no bloom but matt. | Acceptable: homogeneous, no bloom but matt. | Slightly grainy, but no bloom. | Very grainy (not homogeneous), with some dots which could be beginning of fat bloom/fat fractionation | Very grainy and with fat bloom. | Perfect (homogeneous, shiny no bloom) | Very grainy (not homogeneous), with some dots which could be beginning of fat bloom/fat fractionation | Very grainy and with fat bloom. |

The invention claimed is:

1. A method for preparing a filled bakery product, the method comprising:
   providing a filling composition comprising at least one powdered food ingredient and a fat blend comprising from 15 to 67 wt. % of a temper hard fat and from 85 to 33 wt. % of a liquid oil,
   tempering the filling composition to form a tempered filling composition,
   depositing the tempered filling composition on to at least one surface of a bakery product to form a filled bakery product, wherein the surface of the bakery product has a temperature of less than 36° C., and
   actively cooling the deposited filling composition,
   wherein in the step of depositing the tempered filling composition, the tempered filling composition is deposited at a deposition temperature of from 20 to 33° C. and, in the step of actively cooling the deposited filling composition, the deposited filling composition is cooled to a temperature of at least 4° C. below the deposition temperature,
   wherein the temper hard fat has a solid fat content of at least 60 wt. % at 20° C.,
   wherein the liquid oil has a solid fat content of less than 15 wt. % at 20° C., and
   wherein the fat blend has a saturated fatty acid residue content of from 16 to 42 wt. % and a polyunsaturated fatty acid residue content of less than 40 wt. %, based on the total weight of fatty acid residues of the fat blend.

2. The method according to claim 1, wherein the tempered filling composition is aerated to decrease its density to from 650 to 1300 g/L preferably to from 700 to 1200 g/L, more preferably to from 950 to 1190 g/L, prior to the step of depositing the tempered filling composition.

3. The method according to claim 1, wherein in the step of actively cooling the deposited filling composition, the deposited filling composition is cooled to a temperature of at least 5° C., preferably at least 6° C., more preferably at least 7° C., and most preferably from 8 to 10° C. below the deposition temperature.

4. The method according to claim 1, wherein the bakery product has a fat content of less than 18 wt. %, preferably less than 16 wt. %, more preferably less than 14 wt. %, still more preferably less than 12 wt. %, and most preferably from 6 to 12 wt. %.

5. The method according to claim 1, wherein the bakery product comprises a liquid oil selected from the group consisting of canola oil, rapeseed oil, sunflower oil, soy oil, peanut oil, corn oil, cottonseed oil, olive oil, and mixtures of two or more thereof, preferably wherein the liquid oil is native canola oil, soy oil, or a mixture thereof, and most preferably wherein the liquid oil of the bakery product and the liquid oil of the fat blend are the same.

6. A filled bakery product obtainable by the method of claim 1.

7. The method according to claim 1, wherein the method further comprises packaging the filled product.

8. A method for preparing a filled chocolate product, the method comprising:
   providing a filling composition comprising at least one powdered food ingredient and a fat blend comprising from 15 to 67 wt. % of a temper hard fat and from 85 to 33 wt. % of a liquid oil,
   tempering the filling composition to form a tempered filling composition,
   depositing the tempered filling composition on to at least one surface of a chocolate product, wherein the surface of the chocolate product has a temperature of less than 28° C., and
   optionally coating the filling composition with chocolate,
   actively cooling the deposited filling composition,
   wherein in the step of depositing the tempered filling composition, the tempered filling composition is deposited having a temperature of from 20 to 30° C. and in the step of actively cooling the deposited filling composition, the deposited filling composition is cooled to a temperature of at least 4° C. below the deposition temperature, wherein the temper hard fat has a solid fat content of at least 60 wt. % at 20° C., wherein the liquid oil has a solid fat content of less than 15 wt. % at 20° C., and wherein the fat blend has a saturated fatty acid residue content of from 16 to 42 wt. % and a polyunsaturated fatty acid residue content of less than 40 wt. %, based on the total weight of fatty acid residues of the fat blend.

9. A filled chocolate product obtainable by the method of claim 8.

10. The method according to claim 8, wherein the method further comprises packaging the filled product.

11. A method for preparing a filled chocolate product, the method comprising:

providing a filling composition comprising at least one powdered food ingredient and a fat blend comprising from 15 to 67 wt. % of a temper hard fat and from 85 to 33 wt. % of a liquid oil, tempering the filling composition to form a tempered filling composition, depositing the tempered filling composition into a mould or onto a surface to form a discrete body of deposited filling composition, wherein the mould or surface has a temperature of less than 36° C., actively cooling the discrete body, optionally reheating the discrete body to a temperature of less than 31° C., preferably to from 20 to 29° C., at least partially enrobing the discrete body with tempered chocolate to form a filled chocolate product, and cooling the filled chocolate product until the tempered chocolate has solidified, wherein in the step of depositing the tempered filling composition, the tempered filling composition is deposited having a deposition temperature of from 20 to 33° C. and in the step of actively cooling the deposited filling composition, the deposited filling composition is cooled to a temperature of at least 4° C. below the deposition temperature, wherein the temper hard fat has a solid fat content of at least 60 wt. % at 20° C., wherein the liquid oil has a solid fat content of less than 15 wt. % at 20° C., and wherein the fat blend has a saturated fatty acid residue content of from 16 to 42 wt. % and a polyunsaturated fatty acid residue content of less than 40 wt. %, based on the total weight of fatty acid residues of the fat blend.

12. A filled chocolate product obtainable by the method of claim 11.

13. The method according to claim 11, wherein the method further comprises packaging the filled product.

* * * * *